(12) United States Patent
Akashi et al.

(10) Patent No.: US 10,727,494 B2
(45) Date of Patent: Jul. 28, 2020

(54) FUEL CELL

(71) Applicant: KABUSHIKI KAISHA TOYOTA CHUO KENKYUSHO, Nagakute-shi, Aichi (JP)

(72) Inventors: Teruhisa Akashi, Nagakute (JP); Hirofumi Funabashi, Nagakute (JP); Hiroko Iguchi, Nagakute (JP); Hidehito Matsuo, Nagakute (JP); Shigeo Hori, Nagakute (JP)

(73) Assignee: KABUSHIKI KAISHA TOYOTA CHUO KENKYUSHO, Aichi (JP)

( * ) Notice: Subject to any disclaimer, the term of this patent is extended or adjusted under 35 U.S.C. 154(b) by 0 days.

(21) Appl. No.: 15/903,858

(22) Filed: Feb. 23, 2018

(65) Prior Publication Data

US 2018/0277855 A1    Sep. 27, 2018

(30) Foreign Application Priority Data

Mar. 27, 2017 (JP) .................................. 2017-060668

(51) Int. Cl.
| | |
|---|---|
| *H01M 8/1226* | (2016.01) |
| *H01M 4/90* | (2006.01) |
| *H01M 8/1286* | (2016.01) |
| *H01M 8/1213* | (2016.01) |
| *H01M 8/026* | (2016.01) |
| *H01M 4/86* | (2006.01) |
| *H01M 8/124* | (2016.01) |

(52) U.S. Cl.
CPC ........... *H01M 4/905* (2013.01); *H01M 8/026* (2013.01); *H01M 8/1213* (2013.01); *H01M 8/1226* (2013.01); *H01M 8/1286* (2013.01); *H01M 4/8621* (2013.01); *H01M 2008/1293* (2013.01)

(58) Field of Classification Search
CPC ......... H01M 4/905; H01M 8/12–1213; H01M 8/1216; H01M 8/1286
See application file for complete search history.

(56) References Cited

U.S. PATENT DOCUMENTS

| | | |
|---|---|---|
| 2003/0170520 A1 | 9/2003 | Fujii et al. |
| 2012/0009501 A1 | 1/2012 | Kang et al. |
| 2018/0159162 A1* | 6/2018 | Su ...................... H01M 8/1253 |

FOREIGN PATENT DOCUMENTS

| | | |
|---|---|---|
| JP | 2002-170577 A | 6/2002 |
| JP | 2006-520996 A | 9/2006 |
| JP | 2008-505453 A | 2/2008 |
| JP | 2008-098070 A | 4/2008 |
| JP | 2010-538423 A | 12/2010 |
| JP | 2014-123481 A | 7/2014 |
| WO | 02/080299 A1 | 10/2002 |

(Continued)

OTHER PUBLICATIONS

May 28, 2019 Office Action issued in Japanese Patent Application No. 2017-060668.

*Primary Examiner* — Jonathan G Leong
(74) *Attorney, Agent, or Firm* — Oliff PLC

(57) ABSTRACT

A solid oxide fuel cell is disclosed herein. The fuel cell includes a silicon substrate, an electrolyte film laminated on the silicon substrate, and a gas flow path formed inside the silicon substrate. The electrolyte film is opposed to the gas flow path via an electrode film. A portion of a side wall of the gas flow path has a fillet shape, and the portion is close to the electrolyte film.

4 Claims, 24 Drawing Sheets

(56) References Cited

FOREIGN PATENT DOCUMENTS

| WO | 2004/075375 A2 | 9/2004 |
| WO | 2006/004957 A2 | 1/2006 |
| WO | 2009/029249 A1 | 3/2009 |
| WO | 2009/096399 A1 | 8/2009 |
| WO | 2016/190813 A1 | 12/2016 |

* cited by examiner

FUEL CELL

TECHNICAL FIELD

The disclosure herein relates to a fuel cell.

BACKGROUND

International Publication No. WO 2006/004957 describes a fuel cell. The fuel cell is provided with a silicon substrate, an electrolyte film laminated on the silicon substrate, and a gas flow path formed inside the silicon substrate. The electrolyte film is opposed to the gas flow path via an electrode film. An inclination angle of a side wall of the gas flow path with respect to the electrolyte film is substantially 55 degrees and is constant.

SUMMARY

When a solid oxide fuel cell is used as a fuel cell, the fuel cell is exposed to a high temperature ranging within 500 to 700° C. during power generation, and is further exposed to a room temperature when the power generation is terminated. Since a silicon substrate and an electrolyte film have different linear expansion coefficients, warpage is generated in the silicon substrate in which electrolyte is integrated due to a temperature rise upon the power generation and a temperature drop upon the termination of the power generation, as a result of which stress is applied to the electrolyte film. Due to this, if there is a portion in the electrolyte film where stress concentration easily occurs, large stress is applied repeatedly to such a stress concentrating portion of the electrolyte film during when the fuel cell is repeatedly turned on and off, and there is a risk that the electrolyte film may be damaged due to a crack being generated in the electrolyte film at this stress concentrating portion.

When a crystal orientation of a silicon substrate is to be set to (100) and a gas flow path is to be formed therein by anisotropic etching of silicon, an inclination angle of a side wall of the gas flow path becomes substantially 55 degrees, similarly to the fuel cell in International Publication No. WO 2006/004957. In this case, since stress concentration is less likely to occur at an upper end of the gas flow path, even if the fuel cell repeats to turn on and off, and warpage is repeatedly generated in the silicon substrate in which an electrolyte film having a different linear expansion coefficient therefrom is integrated due to a temperature rise and a temperature drop accompanying the repeated turn-on and turn-off, extreme stress concentration does not occur in the electrolyte film and damage to the electrolyte film can be suppressed. However, with such a configuration, the gas flow path becomes wider in a lateral direction when the gas flow path is made deeper in a vertical direction, and as such, there is a problem that a dead space becomes larger. To reduce flow path resistance of the gas flow path, the gas flow path needs to be formed to have a shape with a certain degree of depth in the vertical direction, and thus its width in the lateral direction cannot be suppressed from becoming wide. As a result, integration and miniaturization of the fuel cell becomes difficult with anisotropic etching of silicon.

Unlike the above, when the gas flow path is to be formed by deep reactive ion etching (DRIE) of silicon, the inclination angle of the side wall of the gas flow path becomes substantially 90 degrees. In this case, even if the gas flow path is deepened in the vertical direction to reduce flow path resistance of the gas flow path, the gas flow path will not be widened in the lateral direction. Accordingly, the dead space can be reduced, and integration and miniaturization of the fuel cell can be enhanced. However, with such a configuration, a vicinity of a corner at the upper end of the gas flow path becomes a stress concentrating portion. Due to this, the following becomes problematic. When the fuel cell is repeatedly turned on and off, and the temperature rise and drop (between 500 to 700° C. and the room temperature) are repeated accordingly, warpage is repeatedly generated in the silicon substrate on which the electrolyte film having the different linear expansion coefficient therefrom is provided. At this occasion, stress acts on the electrolyte film, and large stress is applied especially to the electrolyte film in the vicinity of the corner at the upper end of the gas flow path, which is the stress concentrating portion. Due to this, there is a risk that a crack may be generated in the electrolyte film at this portion, which may lead to damage of the electrolyte film.

The disclosure herein provides a solution to the above problem. The disclosure herein provides a technique for a solid oxide fuel cell in which an electrolyte film is laminated on a silicon substrate, that is capable of suppressing damage in the electrolyte film when the fuel cell repeatedly turns on and off, and that is capable of enhancing integration and miniaturization of the fuel cell.

The disclosure herein discloses a solid oxide fuel cell. The fuel cell may comprise a silicon substrate, an electrolyte film laminated on the silicon substrate, and a gas flow path formed inside the silicon substrate. The electrolyte film may be opposed to the gas flow path via an electrode film. A portion of a side wall of the gas flow path may have a fillet shape, and the portion may be close to the electrolyte film.

According to the above configuration, the corner at the upper end of the gas flow path is suppressed from becoming the stress concentrating portion. That is, the fillet shape can disperse stress. Due to this, extreme stress concentration does not occur to the electrolyte film in the vicinity of the corner at the upper end of the gas flow path, which is the stress concentrating portion, and damage to the electrolyte film can be suppressed, even when the fuel cell repeatedly turns on and off; as a result of which the temperature rise and drop (between 500 to 700° C. and the room temperature) are repeated and the warpage is repeatedly generated in the silicon substrate on which the electrolyte film having the different linear expansion coefficient therefrom is provided. Further, according to the above configuration, the portion having the fillet shape simply needs to be provided on the side wall of the gas flow path that is close to the electrolyte film, and the inclination angle of the side wall of the gas flow path does not need to be made small over entirety of the vertical direction, and thus the gas flow path does not widen so much in the lateral direction even when the gas flow path is deepened in the vertical direction. Due to this, the dead space can be reduced, and the integration and miniaturization of the fuel cell can be enhanced.

In the above fuel cell, in a plan view of the silicon substrate, the portion of the side wall of the gas flow path having the fillet shape may extend over an entire circumference of the gas flow path.

According to the above configuration, a configuration can be achieved in which the stress concentration is less likely to occur in the electrolyte film even when the gas flow path is given a large diameter. Damage to the electrolyte film due to a crack generation in the electrolyte film upon when the fuel cell repeatedly turns on and off can more effectively be suppressed.

In the above fuel cell, an inclination angle of the side wall of the gas flow path with respect to the electrolyte film may be substantially 90 degrees at a position apart from the electrolyte film.

According to the above configuration, since the gas flow path does not widen so much in the lateral direction even when the gas flow path is deepened in the vertical direction, the dead space can further be reduced, and the integration and miniaturization of the fuel cell can further be enhanced. The above configuration can be realized by forming the gas flow path at a portion apart from the electrolyte film by deep reactive ion etching (DRIE) of silicon, for example.

In the above fuel cell, an inclination angle of the portion of the side wall of the gas flow path having the fillet shape with respect to the electrolyte film may gradually change.

According to the above configuration, since a gradual fillet shape is given to the corner at the upper end of the gas flow path, this portion can be suppressed from becoming the stress concentrating portion. That is, stress can be dispersed by a fillet structure. Due to this, extreme stress concentration does not occur in the electrolyte film in the vicinity of the corner at the upper end of the gas flow path, which is the stress concentrating portion, and damage to the electrolyte film can be suppressed, even when the fuel cell repeatedly turns on and off, as a result of which the temperature rise and drop (between 500 to 700° C. and the room temperature) are repeated, and the warpage is repeatedly generated in the silicon substrate on which the electrolyte film having the different linear expansion coefficient therefrom is provided. The above configuration can be realized by terminating the deep reactive ion etching (DRIE) of silicon at a stage where the etching has not completely reached the electrolyte film, upon forming the gas flow path, for example.

In the above fuel cell, a radius of curvature of the portion of the side wall of the gas flow path having the fillet shape may be within a range of 1 μm to 10 μm.

Normally in a solid oxide fuel cell, a film thickness of the electrolyte film is about 20 to 2000 nm. Due to this, if the radius of curvature of the portion of the side wall of the gas flow path having the fillet shape is within the range of about 1 μm to 10 μm, the electrolyte film can sufficiently be reinforced. Thus, according to the above configuration, stress can be dispersed by the fillet structure. Due to this, extreme stress concentration does not occur in the electrolyte film in the vicinity of the corner at the upper end of the gas flow path, which is the stress concentrating portion, and damage to the electrolyte film can be suppressed, even when the fuel cell repeatedly turns on and off, as a result of which the temperature rise and drop (between 500 to 700° C. and the room temperature) are repeated, and the warpage is repeatedly generated in the silicon substrate on which the electrolyte film having the different linear expansion coefficient therefrom is provided.

Alternatively, in the above fuel cell, an inclination angle of the portion of the side wall of the gas flow path having the fillet shape with respect to the electrolyte film may be substantially 55 degrees.

According to the above configuration, since a linear fillet shape is given to the corner at the upper end of the gas flow path, this portion can be suppressed from becoming the stress concentrating portion. That is, stress can be dispersed by the fillet structure. Due to this, extreme stress concentration does not occur in the electrolyte film in the vicinity of the corner at the upper end of the gas flow path, which is the stress concentrating portion, and damage to the electrolyte film can be suppressed, even when the fuel cell repeatedly turns on and off, as a result of which the temperature rise and drop (between 500 to 700° C. and the room temperature) are repeated, and the warpage is repeatedly generated in the silicon substrate on which the electrolyte film having the different linear expansion coefficient therefrom is provided. The above configuration can be realized by terminating the deep reactive ion etching (DRIE) of silicon at a stage where the etching has not reached the electrolyte film upon forming the gas flow path, and thereafter by performing anisotropic etching of silicon, for example.

DETAILED DESCRIPTION

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved fuel cells, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

First Embodiment

Figure 1:
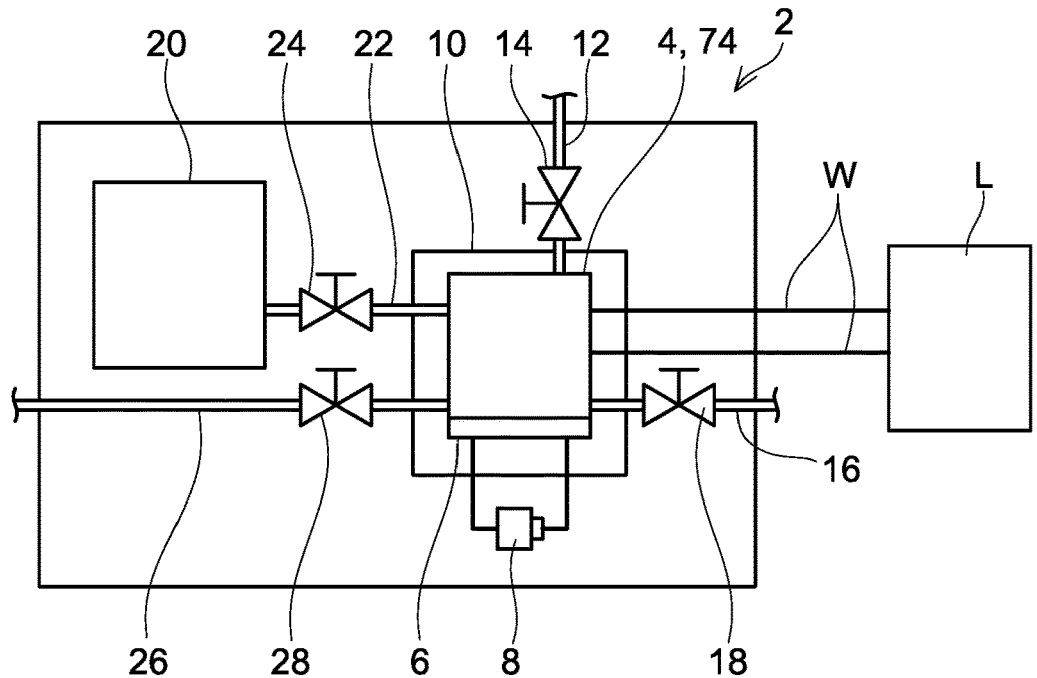
FIG. 1 is a schematic diagram showing an overview configuration of a fuel cell system 2 of first and second embodiments.

FIG. 1 schematically shows a configuration of a fuel cell system 2. The fuel cell system 2 generates electricity and heat by reaction of oxygen in air and hydrogen in fuel gas. The fuel cell system 2 includes a fuel cell 4 which is a solid oxide fuel cell (SOFC), a heater 6 configured to heat the fuel cell 4, a battery 8 configured to supply power to the heater 6, a heat sink 10 configured to dissipate heat from the fuel cell 4, an air supply path 12 configured to supply the air to the fuel cell 4 from outside of the fuel cell system 2, an on-off valve 14 provided on the air supply path 12, an air discharge path 16 configured to discharge post-reaction air from the fuel cell 4 to the outside of the fuel cell system 2, a sealing valve 18 provided on the air discharge path 16, a cartridge 20 filled with the fuel gas, a fuel gas supply path 22 configured to supply the fuel gas to the fuel cell 4 from the cartridge 20, a pressure reducing valve 24 provided on the fuel gas supply path 22, a fuel gas discharge path 26 configured to discharge post-reaction fuel gas from the fuel cell 4 to the outside of the fuel cell system 2, and a sealing valve 28 provided on the fuel gas discharge path 26. The fuel cell system 2 supplies the power generated by the fuel cell 4 to a target load L through a power line W.

When power generation is to be performed in the fuel cell system 2, the pressure reducing valve 24 is opened, and the fuel gas filling the cartridge 20 is supplied to the fuel cell 4 through the fuel gas supply path 22. When the fuel gas fills the fuel cell 4, the sealing valve 28 and the pressure reducing valve 24 are closed. Further, the on-off valve 14 is opened to supply the air outside the fuel cell system 2 to the fuel cell 4 through the air supply path 12. When the air fills in the fuel cell 4, the sealing valve 18 and the on-off valve 14 are closed. Thereafter, the heater 6 is actuated by the power from the battery 8 to heat the fuel cell 4 to a predetermined reaction temperature, for example, to 600° C. Due to this, the power generation is started in the fuel cell 4 by chemical reaction of oxygen and hydrogen. Since the chemical reaction of oxygen and hydrogen is also exothermic, once the power generation is started, the power generation is continued with the fuel cell 4 being maintained at a high temperature, even when heating by the heater 6 is turned off. Thereafter, gas that did not contribute to the reaction and water vapor generated in the reaction are discharged to the outside of the fuel cell system 2 by opening the sealing valve 28 and the sealing valve 18, and the fuel gas and the air are resupplied into the fuel cell 4 by opening the pressure reducing valve 24 and the on-off valve 14. By repeating the above procedure, the power generation by the fuel cell 4 is continued. The power generated by the fuel cell 4 is supplied to the target load L through the power line W. Depending on types of the target load L, a plurality of the fuel cells 4 may be connected serially or in parallel.

Figure 2:
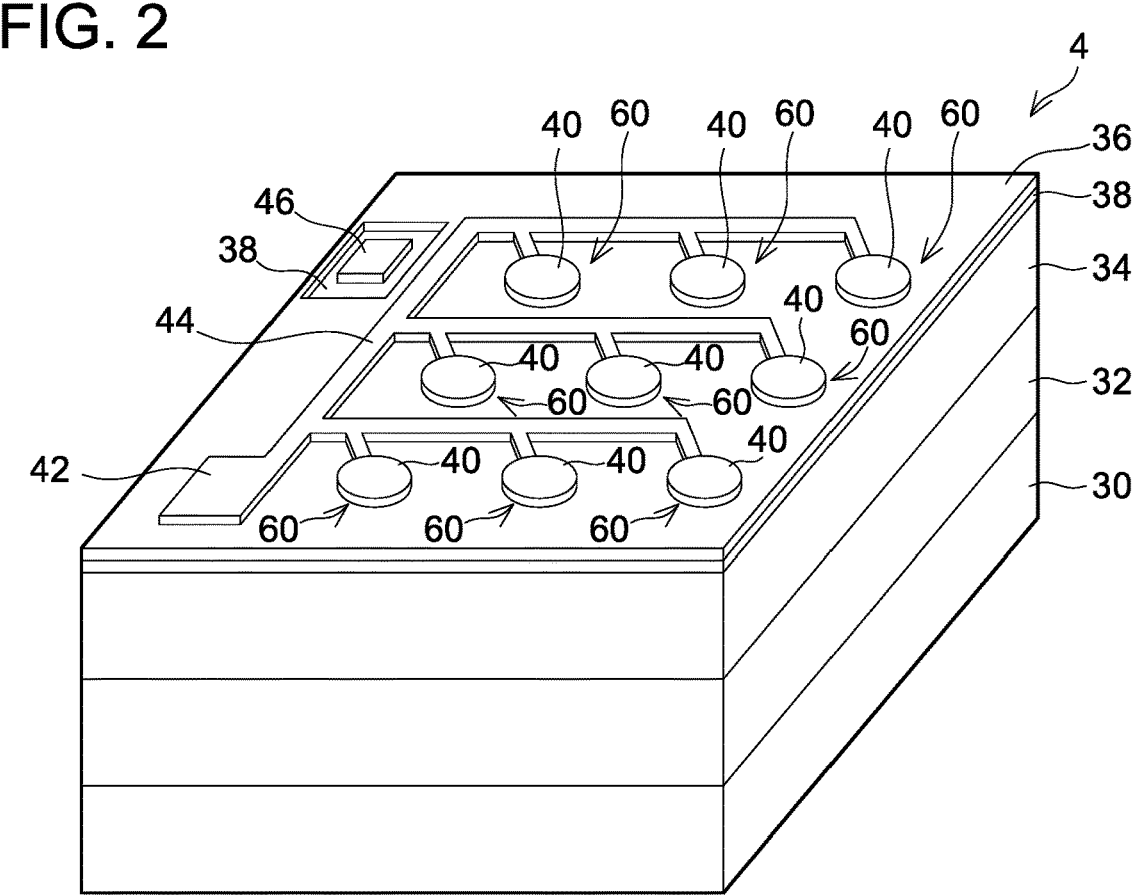
FIG. 2 is a perspective view showing an overview configuration of a fuel cell 4 of the first embodiment.

As shown in FIG. 2, the fuel cell 4 is provided in a laminated substrate in which a first silicon substrate 30, a second silicon substrate 32, a third silicon substrate 34, and an electrolyte film. 36 are laminated in this order. All of the first silicon substrate 30, the second silicon substrate 32, and the third silicon substrate 34 are non doped and high-resistance silicon substrates. The electrolyte film 36 is a thin film constituted of LSO (lanthanum silicate oxyapatite), YSZ (yttria-stabilized zirconia), $LaGaO_3$ (lanthanum gallate), or the like. A thickness of the electrolyte film 36 is about 20 to 2000 nm. An insulating film 38 constituted of silicon oxide is provided at an interface between the third silicon substrate 34 and the electrolyte film 36. A plurality of first electrode films 40, a first electrode pad 42, and a wiring 44 for electrically connecting the first electrode films 40 and the first electrode pad 42 are provided on an upper surface of the electrolyte film 36. Further, a part of the electrolyte film 36 is removed by etching, and a second electrode pad 46 is provided on an upper surface of the insulating film 38 where the electrolyte film 36 has been removed. A through silicon via (not shown) is provided under the second electrode pad 46. The first electrode films 40 are electrode films having catalyst and current collecting effects, and are metal films constituted of Pt, Cr/Ni, Ni/Pt, Ti/Pt, or Cr/Pt, or a compound or a laminated film including at least one of the aforementioned metals. Alternatively, the first electrode films 40 may be conductive films in which particles of at least one of the aforementioned metals are contained or carried, such as conductive ceramic films. The first electrode films 40 function as air electrodes in the fuel cell 4. The first electrode films 40 have porous structures. The first electrode films 40 are exposed to a space communicating with the air supply path 12 and the air discharge path 16. In an example shown in FIG. 2, the first electrode films 40 are arranged in a 3×3 array. A number of the first electrode films 40 is not limited thereto. Any conductive material having durability against a high temperature of 500 to 700° C. may be used as the first electrode pad 42, the wiring 44, and the second electrode pad 46, and they may, for example, be constituted of metal such as Pt/Cr, Pt/Ni, Pt/Ti, Mo, Ta, W, WSi, and the like.

Figure 3:
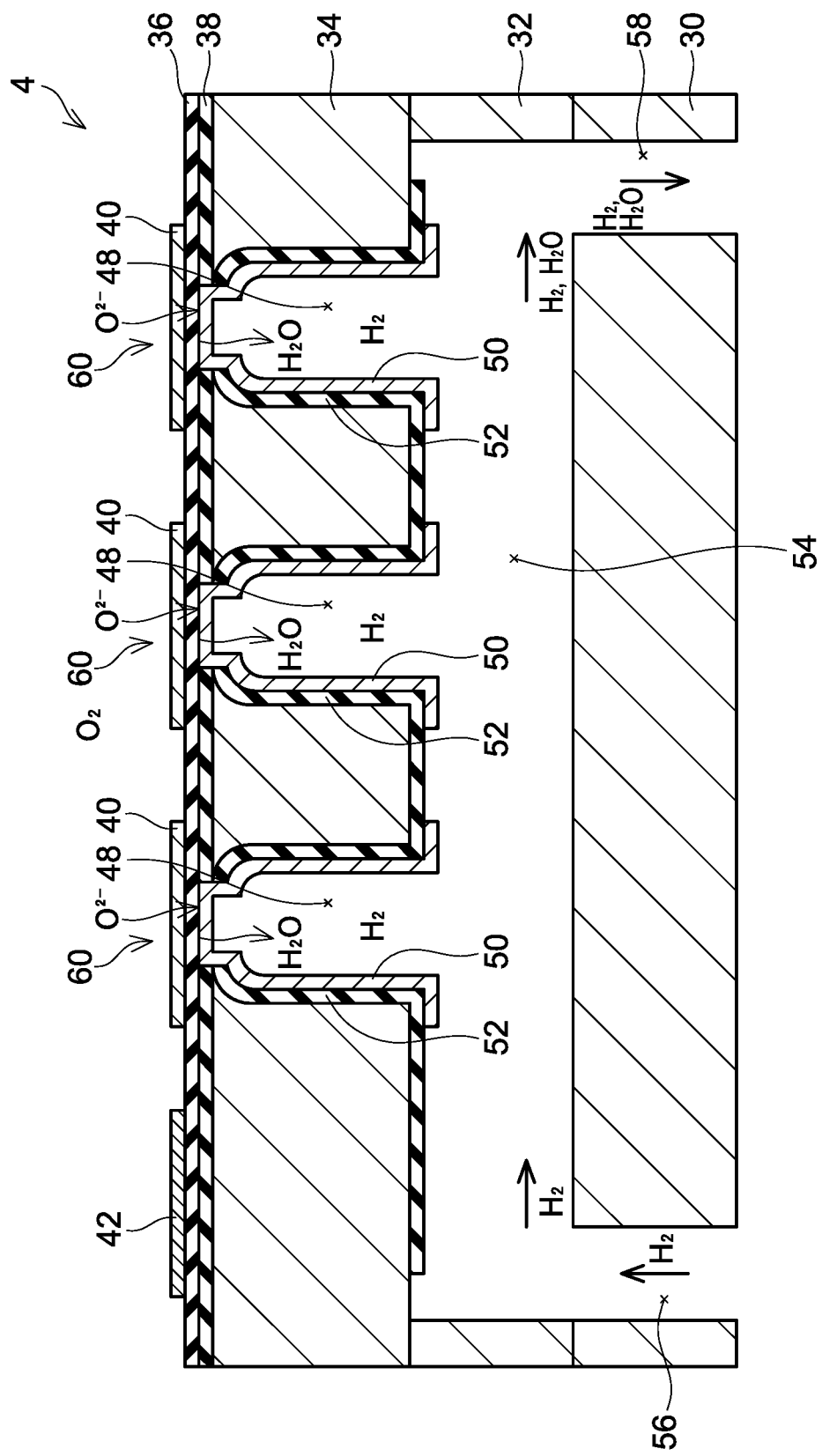
FIG. 3 is a vertical cross sectional view of the fuel cell 4 of the first embodiment.

As shown in FIG. 3, a plurality of gas flow paths 48 and a plurality of second electrode films 50 are provided inside the third silicon substrate 34, corresponding respectively to the first electrode films 40. The second electrode films 50 are provided on their corresponding gas flow paths 48. The second electrode films 50 are electrode films having catalyst and current collecting effects, and are metal films constituted of Pt, Cr/Ni, Ni/Pt, Ti/Pt, or Cr/Pt, or a compound or a laminated film including at least one of the aforementioned metals. Alternatively, the second electrode films 50 may be conductive films on which particles of at least one of the aforementioned metals are contained or carried, such as conductive ceramic films. The second electrode films 50 function as fuel electrodes in the fuel cell 4. The second electrode films 50 have porous structures.

An insulating film 52 constituted of silicon oxide is provided at each interface between the second electrode film 50 of the gas flow path 48 and the third silicon substrate 34. At each of the gas flow paths 48, the electrolyte film 36 is opposed to the gas flow path 48 via the second electrode film 50. Further, at each of the gas flow paths 48, the first electrode film 40 is opposed to the second electrode film 50 via the electrolyte film 36. In the fuel cell 4, a plurality of power generating elements 60 is constituted of the first electrode films 40, the electrolyte film 36, and the second electrode films 50. Each of the second electrode films 50 is electrically connected to the second electrode pad 46 (see FIG. 2) on a front surface side of the third silicon substrate 34 via a wiring (not shown) arranged on a rear surface side of the third silicon substrate 34 and the through silicon via (not shown) passing through the third silicon substrate 34. The wiring and the through silicon via may be constituted of a conductive material having the resistance to a high temperature of 500 to 700° C., and they may, for example, be constituted of metal such as Pt/Cr, Pt/Ni, Pt/Ti, Mo, Ta, W, WSi, and the like.

A gas distribution path 54 is formed inside the second silicon substrate 32. The gas distribution path 54 communicates with each of the gas flow paths 48 in the third silicon substrate 34. A gas flow inlet path 56 communicating with the fuel gas supply path 22, and a gas flow outlet path 58 communicating with the fuel gas discharge path 26 are formed inside the first silicon substrate 30. The fuel gas that is supplied from the fuel gas supply path 22 to the fuel cell 4 is supplied to the respective gas flow paths 48 through the gas flow inlet path 56 and the gas distribution path 54. Further, the fuel gas after having been subjected to the reaction in the respective gas flow paths 48 is discharged to the fuel gas discharge path 26 through the gas distribution path 54 and the gas flow outlet path 58.

In the fuel cell 4, the fuel gas is supplied to each of the gas flow paths 48. On the other hand, the air is supplied to an upper surface side of the fuel cell 4. Oxygen in the air enters the first electrode films 40 having the porous structures, and reaches the electrolyte film 36. Then, oxygen that has reached the electrolyte film 36 transforms into oxide ions ($O^{2-}$) by Pt particles serving as catalyst, and the oxide ions pass through the electrolyte film 36 and reach the second electrode films 50. Further, hydrogen in the fuel gas passes through the second electrode films 50 having the porous structures, and reaches the electrolyte film 36, where it reacts with the oxide ions, as a result of which water vapor is generated and electrons are emitted. The emitted electrons are collected in the second electrode pad 46 through the second electrode films 50, the wiring, and the through silicon via. Further, the water vapor generated by the reaction is discharged to the gas flow paths 48, and is discharged from the gas flow paths 48 together with hydrogen that did not contribute to the reaction.

As shown in FIG. 3, in the fuel cell 4 of the present embodiment, a corner at an upper end of each gas flow path 48 has a rounded shape, and thus a fillet of the third silicon substrate 34 is provided in a vicinity of the electrolyte film 36. That is, in the fuel cell 4 of the present embodiment, side walls of the gas flow paths 48 have fillet shapes at their portions close to the electrolyte film 36. When the third silicon substrate 34 is seen in a plan view, the portion of the side wall of each gas flow path 48 having the fillet shape extends over an entire circumference of the gas flow path 48. An inclination angle of the fillet-shaped portion of the side wall of each gas flow path 48 relative to the electrolyte film 36 changes gradually. A radius of curvature of the fillet-shaped portion of the side wall of each gas flow path 48 is within a range of 1 μm to 10 μm. Moreover, the inclination angle of the side wall of each gas flow path 48 relative to the electrolyte film 36 is substantially 90 degrees at a position apart from the electrolyte film 36. Advantages that can be achieved by such a configuration will be described below.

The solid oxide fuel cell 4 is exposed to the high temperature of 500 to 700° C. during the power generation, and is exposed to the room temperature when the power generation is terminated. Since linear expansion coefficients are different for the third silicon substrate 34 and for the electrolyte film 36, warpage is generated in the third silicon substrate 34 to which the electrolyte film 36 is integrated due to a temperature rise during the power generation and a temperature drop when the power generation is terminated, as a result of which stress is applied to the electrolyte film 36. Due to this, if there is a portion in the electrolyte film 36 where stress concentration easily occurs, large stress is applied repeatedly to such a stress concentrating portion of the electrolyte film 36 during when the fuel cell 4 is repeatedly turned on and off, and there is a risk that the electrolyte film 36 may be damaged due to a crack being generated in the electrolyte film 36 at this portion.

Figure 4:
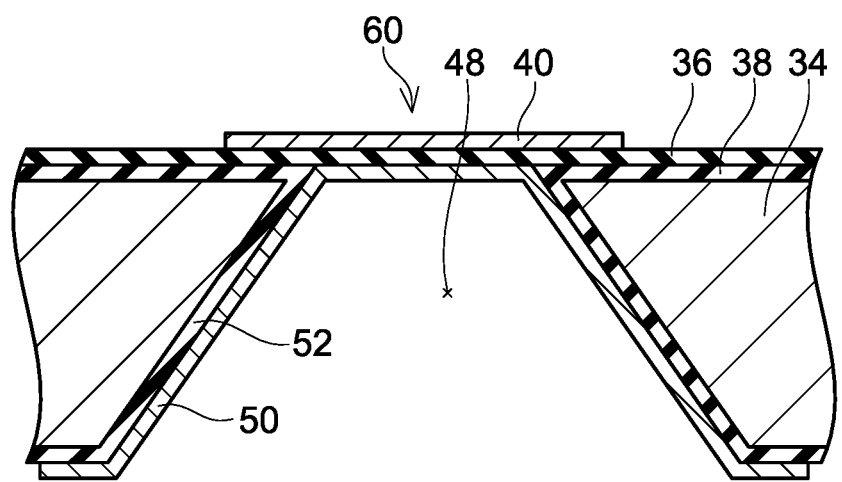
FIG. 4 is a cross sectional view showing a shape of a gas flow paths 48 of a comparative example.

FIG. 4 shows a reference example of a configuration of a case where the gas flow paths 48 of the fuel cell 4 are formed by anisotropic etching of the third silicon substrate 34. In this case, the third silicon substrate 34 has a crystal orientation (100), and the inclination angle of the side wall of each gas flow path 48 relative to the electrolyte film 36 as formed by the anisotropic etching becomes substantially 55 degrees. Further, the inclination angle of the side wall of each gas flow path 48 relative to the electrolyte film 36 is constantly at substantially 55 degrees for positions close to the electrolyte film 36 and for positions far from the electrolyte film 36. In the configuration shown in FIG. 4, the stress concentration is less likely to occur at the positions close to the electrolyte film 36, and thus extreme stress concentration does not occur in the electrolyte film 36 and damage to the electrolyte film 36 can be suppressed, even if the fuel cell 4 repeatedly turns on and off, and the warpage is repeatedly generated in the third silicon substrate 34 due to the temperature rise and the temperature rise accompanying the turn-on and off. However, in the configuration shown in FIG. 4, the gas flow paths 48 have a shape that becomes wider in a lateral direction at positions farther from the electrolyte film 36 (at positions toward a lower side in FIG. 4). Due to this, in the configuration shown in FIG. 4, a dead space becomes large, and integration and miniaturization of the power generating elements 60 become difficult.

Figure 5:
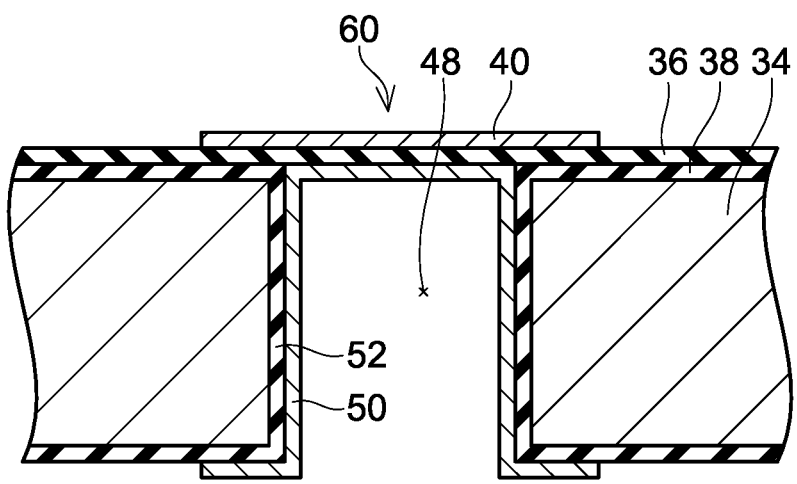
FIG. 5 is a cross sectional view showing a shape of the gas flow paths 48 of another comparative example.

FIG. 5 shows a configuration of a case where the gas flow paths 48 of the fuel cell 4 are formed by deep reactive ion etching (DRIE) of the third silicon substrate 34, as another reference example. In this case, the inclination angle of the side wall of each gas flow path 48 relative to the electrolyte film 36 as formed by the deep reactive ion etching becomes substantially 90 degrees. Further, the inclination angle of the side wall of each gas flow path 48 relative to the electrolyte film 36 is constantly at substantially 90 degrees for the positions close to the electrolyte film 36 and for the positions far from the electrolyte film 36. In the configuration shown in FIG. 5, the gas flow paths 48 have a shape that does not become wider in the lateral direction even at the positions farther from the electrolyte film 36 (at positions toward a lower side in FIG. 5). Due to this, in the configuration shown in FIG. 5, the dead space can be reduced to enhance the integration and the miniaturization of the power generating elements 60. However, in the configuration shown in FIG. 5, vicinities of the corners at the upper ends of the gas flow paths 48 become stress concentrating portions. Due to this, the following becomes problematic. When the fuel cell 4 repeatedly turns on and off, as a result of which the temperature rise and drop (between 500 to 700° C. and the room temperature) are repeated, warpage is repeatedly generated in the third silicon substrate 34 on which the electrolyte film 36, the insulating film 38, and the insulating films 52 having different linear expansion coefficients therefrom are provided. At such an occasion, stress acts on the electrolyte film 36, and large stress acts especially on the electrolyte film 36 in the vicinities of the corners at the upper ends of the gas flow paths 48 being the stress concentrating portions. Due to this, a crack may be generated in the electrolyte film 36 at the portions, and there is a risk that the electrolyte film 36 may be damaged.

Figure 6:
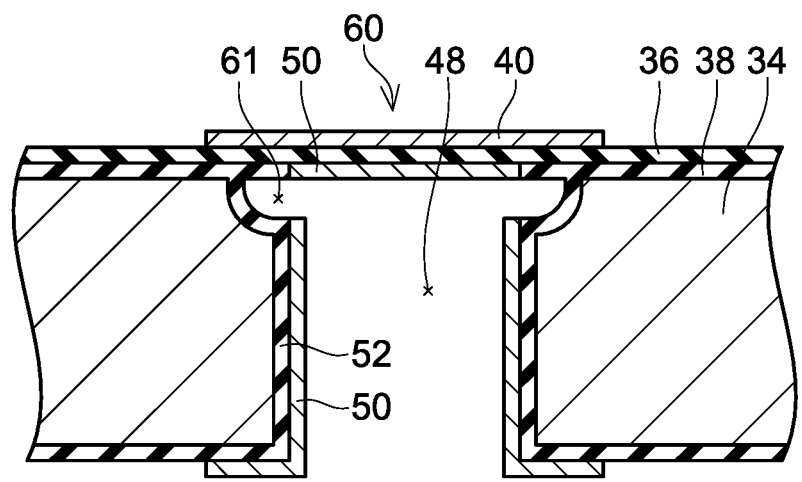
FIG. 6 is a cross sectional view showing a shape of the gas flow paths 48 of yet another comparative example.

Further, in the case of attempting to form the gas flow paths 48 as in FIG. 5 by using the deep reactive ion etching, as shown in FIG. 6, a notch 61 may be formed in a vicinity of each interface of the third silicon substrate 34 with the insulating film 38. Such notches 61 are formed by a progressing direction of ions that are generated due to dissociation from etching gas by plasma in the deep reactive ion etching being deflected in the lateral direction by repelling against charges accumulated at a surface of the insulating film 38, and by the third silicon substrate 34 being thereby etched in the lateral direction in the vicinities of the interfaces with the insulating film 38. When such notches 61 are formed, vicinities of the notches 61 become stress concentrating portions. Due to this, the following becomes problematic. When the fuel cell 4 repeatedly turns on and off, as the result of which the temperature rise and drop (between 500 to 700° C. and the room temperature) are repeated, the warpage is repeatedly generated in the third silicon substrate 34 on which the electrolyte film 36, the insulating film 38, and the insulating films 52 having the different linear expansion coefficients therefrom are provided. At such an occasion, stress acts on the electrolyte film 36, and large stress acts especially on the electrolyte film 36 in the vicinities of the corners at the upper ends of the gas flow paths 48 being the stress concentrating portions. Due to this, a crack may be generated in the electrolyte film 36 at such portions, and there is a risk that the electrolyte film 36 may be damaged. Further, upon forming the second electrode films 50, metal particles may not enter sufficiently into the notches 61, as a result of which a portion of each second electrode film 50 covering the electrolyte film 36 and a portion of the second electrode film 50 on the rear surface side of the third silicon substrate 34 may be disconnected, and thereby there is a risk of conduction failure.

With respect to this, as shown in FIG. 3, in the fuel cell 4 of the present embodiment, the side wall of each gas flow path 48 has the fillet shape at its portion close to the electrolyte film 36. With the configuration as above, the vicinities of the corners at the upper ends of the gas flow paths 48 can be suppressed from becoming the stress concentrating portions. That is, the fillet shape can disperse the stress. Due to this, even when the fuel cell 4 repeatedly turns on and off, as the result of which the temperature rise and drop (between 500 to 700° C. and the room temperature) are repeated, and the warpage is repeatedly generated in the third silicon substrate 34 on which the electrolyte film 36, the insulating film 38, and the insulating films 52 having the different linear expansion coefficients therefrom are provided, extreme stress concentration does not occur in the electrolyte film 36 in the vicinities of the corners at the upper ends of the gas flow paths 48 being the stress concentrating portions, and damage to the electrolyte film 36 can be suppressed. Further, in the fuel cell 4 of the present embodiment, since the gas flow paths 48 are not widened so much in the lateral direction even when the gas flow paths 48 are deepened in a vertical direction, the dead space can be reduced and the integration and the miniaturization of the power generating elements 60 can be enhanced.

In the example shown in FIG. 2, all of the power generating elements 60 are electrically connected in parallel, and a diameter of a region contributing to the power generation in the fuel cell 4 is designed to be large. With the configuration as above, a size of each power generating element 60 can be made small so as to gain further resistance against damage, and reliability can be increased. Further, with the configuration as above, even if part of the power generating elements 60 is damaged, a function as the fuel cell 4 can be sustained if the remaining power generating elements 60 are functioning. That is, product life of the fuel cell 4 can be elongated.

Hereinbelow, a method of manufacturing the fuel cell 4 of the present embodiment will be described.

Figure 7:
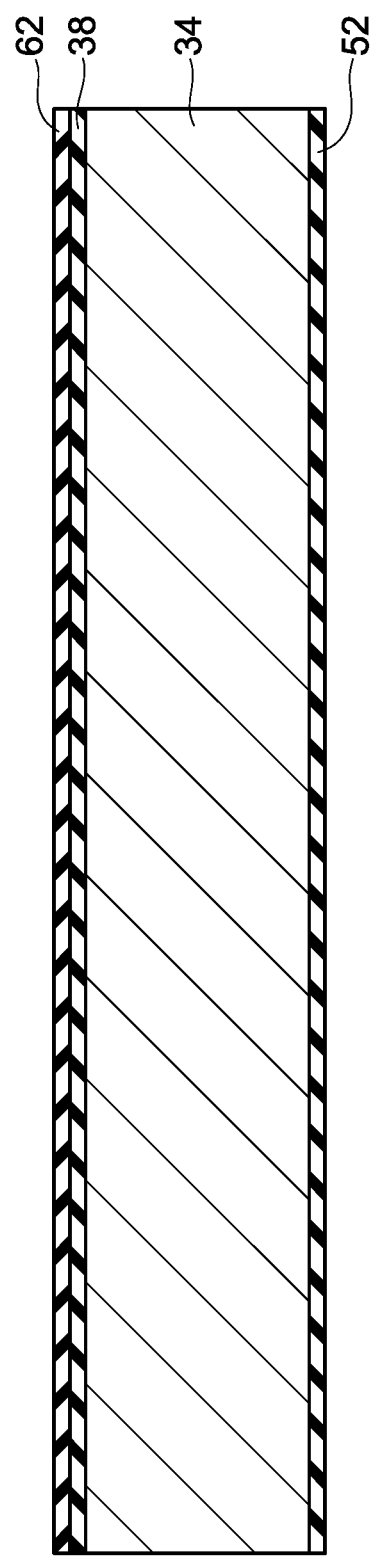
FIG. 7 is a diagram explaining a manufacturing method of the fuel cell 4 of the first embodiment.

Firstly, as shown in FIG. 7, a silicon substrate having the crystal orientation (100), which is to be the third silicon substrate 34, is prepared. Then, the third silicon substrate 34 is RCA-cleaned, after which it is light-etched by a 1:100 HF solution to remove a natural oxide film. Then, the insulating film 52, which is a silicon oxide film, is deposited on the rear surface of the third silicon substrate 34 using plasma CVD. The insulating film 52 has a large thickness of about 1.5 µm, for example. Then, the insulating film 38, which is a silicon oxide film, is deposited on the front surface of the third silicon substrate 34 using the plasma CVD. The insulating film 38 has a thickness of about 10 to 20 nm, for example. Then, an LSO precursor film 62 is deposited on the front surface of the third silicon substrate 34 using a sol-gel process. The LSO precursor film 62 is deposited by spin-coating a solvent for forming the LSO precursor film 62 under a condition of 1500 rpm and 30 seconds, for example. The solvent for forming the LSO precursor film 62 may, for example, be a mixture of lanthanum nitrate water, ethanol-mixed solution, and TEOS. The condition of the spin coating may be changed according to a desired thickness of the LSO precursor film 62 to be deposited. After the spin coating, prebaking is performed on a hot plate within a temperature range of 200 to 400° C.

Figure 8:
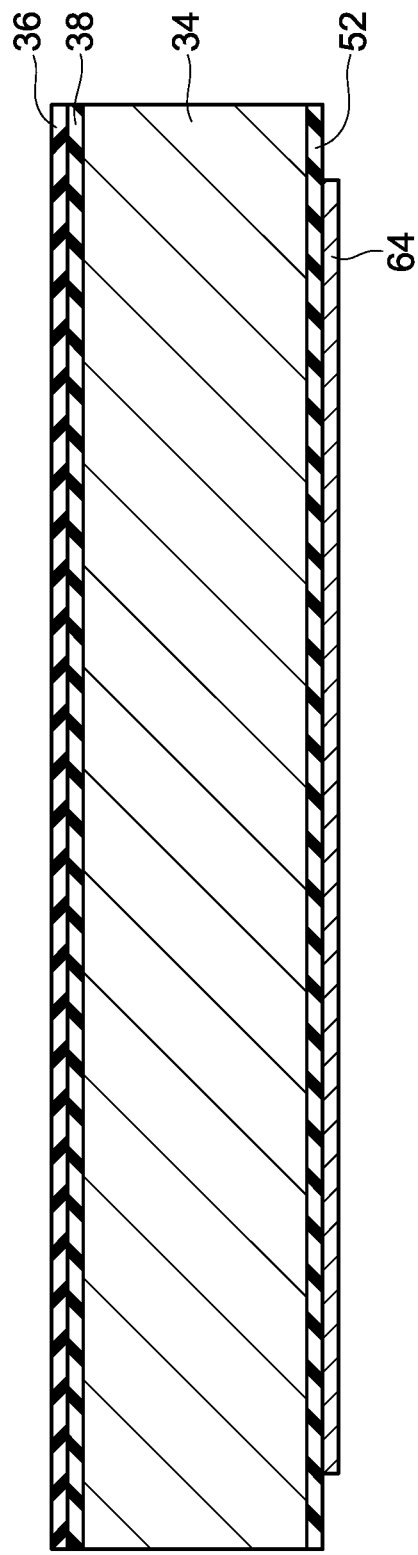
FIG. 8 is a diagram explaining the manufacturing method of the fuel cell 4 of the first embodiment.

Next, as shown in FIG. 8, the third silicon substrate 34 is placed in a high-temperature electric furnace, for example, and is baked for about two hours within a temperature range of 800 to 1100° C. under aerial atmosphere. Due to this, the LSO precursor film 62 is crystalized and the electrolyte film 36 is thereby formed. Next, although not shown in FIG. 8, the electrolyte film 36 corresponding to a portion where the second electrode pad 46 is to be formed is removed by etching, and the insulating film 38 is exposed. Further, the through silicon via (not shown) is formed by using a doped polysilicon film, for example. Further, a resist 64 with a thickness of about 1 μm is applied to the insulating film 52 on the rear surface side of the third silicon substrate 34, and a mask pattern is formed on the resist 64 by using photolithography.

Figure 9:
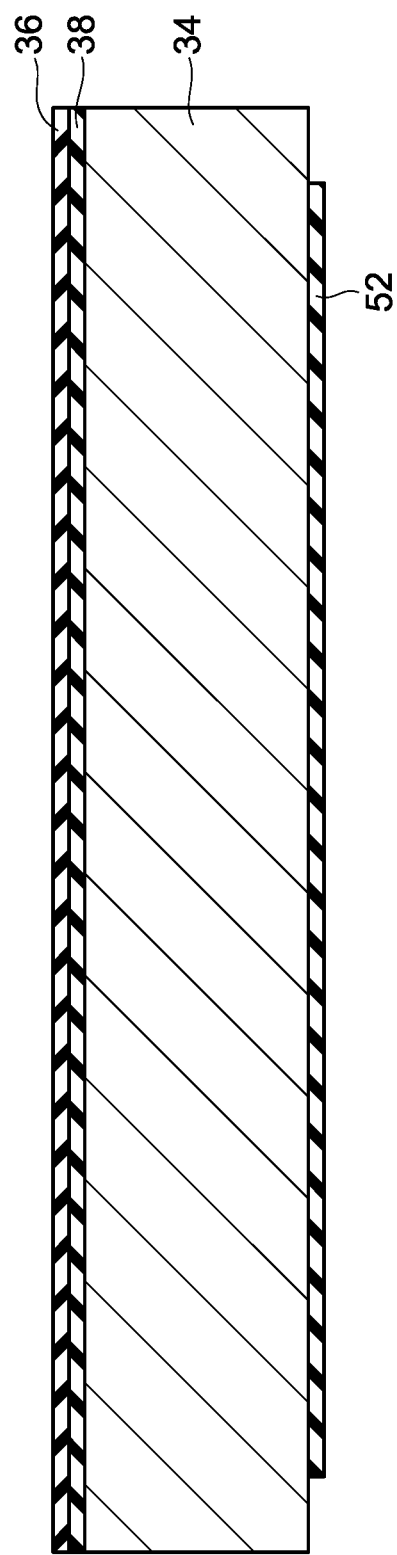
FIG. 9 is a diagram explaining the manufacturing method of the fuel cell 4 of the first embodiment.

Next, as shown in FIG. 9, the silicon oxide is etched by using the resist 64 as a mask to form a pattern on the insulating film 52. At this stage, the insulating film 52 located at portions corresponding to junctions between the third silicon substrate 34 and the second silicon substrate 32 is selectively removed. Then, the resist 64 on the insulating film 52 is removed by using a resist remover, for example.

Figure 10:
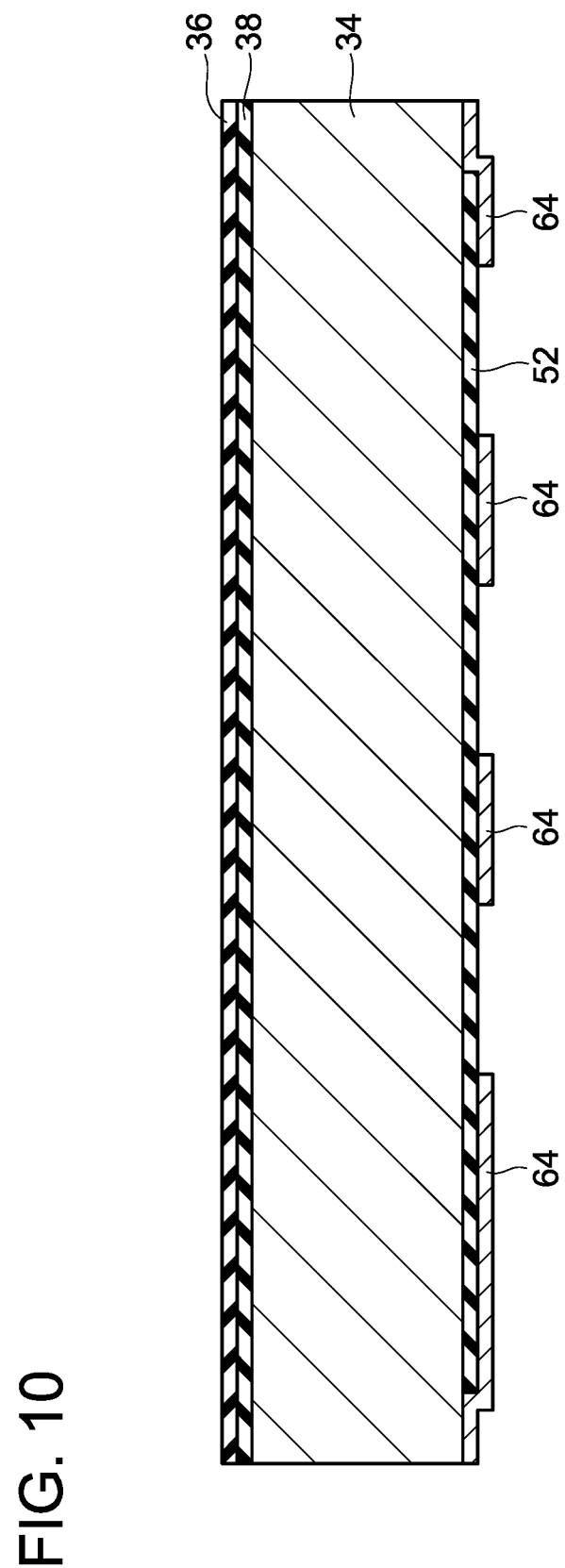
FIG. 10 is a diagram explaining the manufacturing method of the fuel cell 4 of the first embodiment.

Next, as shown in FIG. 10, the resist 64 with a thickness of about 1 to 2 μm is applied again to the rear surface side of the third silicon substrate 34, and a mask pattern is formed on the resist 64 by using the photolithography.

Figure 11:
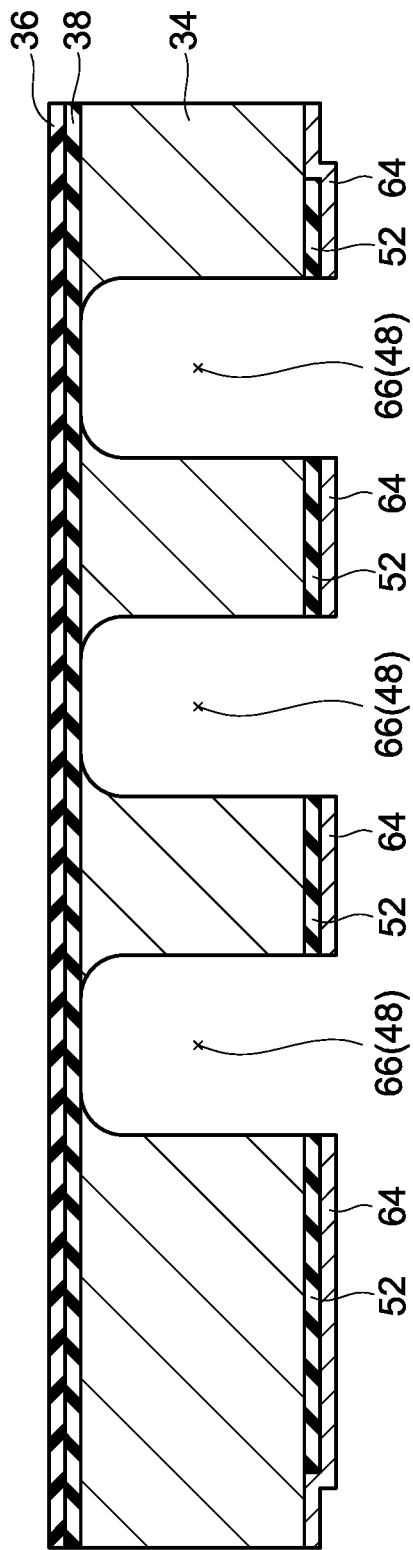
FIG. 11 is a diagram explaining the manufacturing method of the fuel cell 4 of the first embodiment.

Next, as shown in FIG. 11, the silicon oxide is etched by using the resist 64 as a mask to form a pattern on the insulating film 52. At this stage, the insulating film 52 located at portions corresponding to the gas flow paths 48 of the third silicon substrate 34 is selectively removed. Then, the deep reactive ion etching of silicon is performed by using the resist 64 and the insulating film 52 as masks. The deep reactive ion etching is a cyclic process that repeats formation of a deposited film and etching, and it is an anisotropic dry etching with which the etching progresses in a thickness direction of the third silicon substrate 34 (vertical direction) while protecting side walls of trenches 66 by deposited films. The deep reactive ion etching tends to have a fast etching speed at a center of each trench 66 and slow etching speed at a periphery of each trench 66. Due to this, as shown in FIG. 11, the trenches 66 formed by the deep reactive ion etching have a rounded shape at corners at their leading ends. As shown in FIG. 11, in the present embodiment, the deep reactive ion etching is terminated in a state where the center of each trench 66 has reached the insulating film 38 but the periphery of each trench 66 has not reached the insulating film 38. The trenches 66 constitute the gas flow paths 48. Although not shown, the side wall of each gas flow path 48 has a deposited film formed thereon at this stage.

Figure 12:
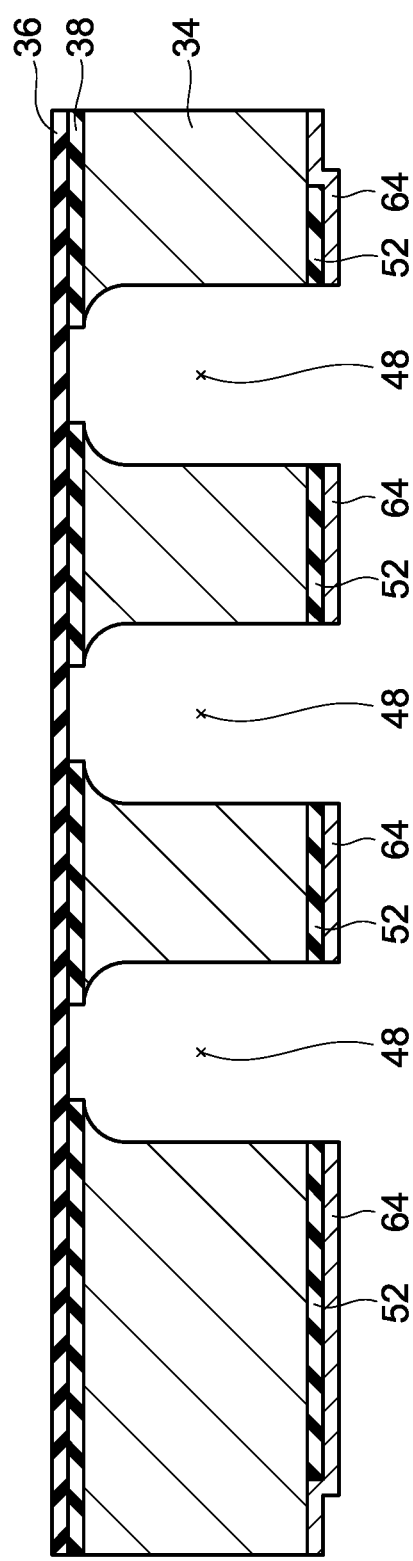
FIG. 12 is a diagram explaining the manufacturing method of the fuel cell 4 of the first embodiment.

Next, as shown in FIG. 12, etching of silicon oxide is performed to remove portions of the insulating film 38 that are exposed to the gas flow paths 48. Due to this, the electrolyte film 36 is exposed to the gas flow paths 48.

Figure 13:
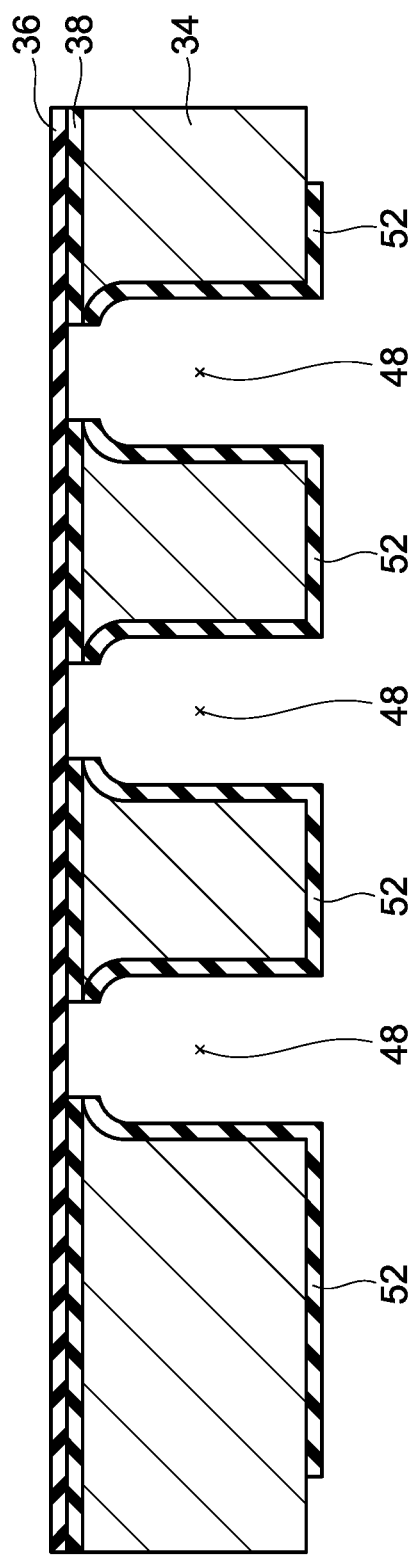
FIG. 13 is a diagram explaining the manufacturing method of the fuel cell 4 of the first embodiment.

Next, as shown in FIG. 13, the deposited films on the side walls of the gas flow paths 48 and the resist 64 on the insulating film 52 are removed, for example, by oxygen plasma ashing. After the deposited films on the side walls of the gas flow paths 48 have been removed by the oxygen plasma ashing, the insulating film 52, which is a silicon oxide film of about 10 nm, is formed on the side wall of each gas flow path 48. The insulating film 52 that is the silicon oxide film formed on the rear surface side of the third silicon substrate 34 and the insulating films 52 that are the silicon oxide films formed on the side walls of the gas flow paths 48 have different thicknesses, however, they are shown with about the same degree of thickness in the drawings for the sake of easier understanding.

Figure 14:
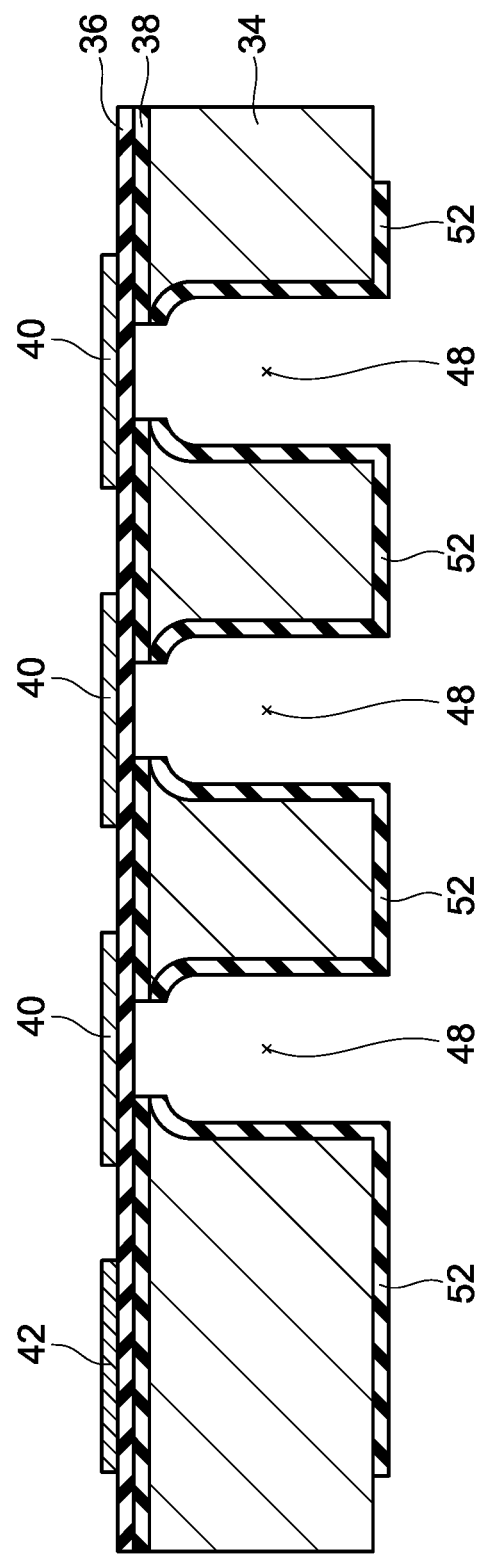
FIG. 14 is a diagram explaining the manufacturing method of the fuel cell 4 of the first embodiment.

Next, as shown in FIG. 14, porous Pt films are locally deposited using a metal masking process to form the plurality of first electrode films 40. The porous Pt films may be deposited by vapor deposition, or may be deposited by sputtering. Further, the first electrode pad 42, the wiring 44, and the second electrode pad 46 are formed by using the metal masking process or the photolithography.

Figure 15:
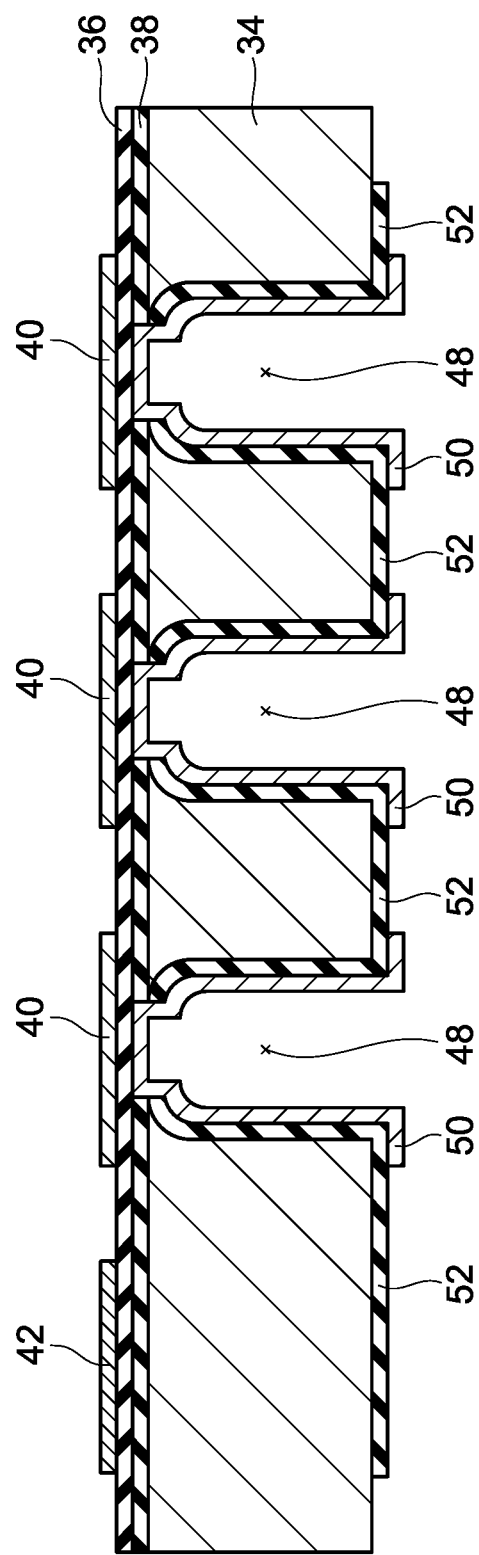
FIG. 15 is a diagram explaining the manufacturing method of the fuel cell 4 of the first embodiment.

Next, as shown in FIG. 15, porous Pt films are locally deposited using the metal masking process to form the plurality of second electrode films 50. The porous Pt films may be deposited by vapor deposition, or may be deposited by sputtering. Further, Pt films may be vapor-deposited, and may be subjected to heat treatment to create porous structures therein to obtain the porous Pt films. Further, a conductive material is deposited using the metal masking process to form the wiring (not shown) to be connected to the through silicon via (not shown) for current collection.

After this, as shown in FIG. 3, the first silicon substrate 30 and the second silicon substrate 32 are respectively prepared, and bonding of the first silicon substrate 30 and the second silicon substrate 32 as well as bonding of the second silicon substrate 32 and the third silicon substrate 34 are performed. The first silicon substrate 30 has the gas flow inlet path 56 and the gas flow outlet path 58 formed in a silicon substrate. The second silicon substrate 32 has the gas distribution path 54 formed in a silicon substrate. The first silicon substrate 30 and the second silicon substrate 32 are bonded by silicon direct bonding. This bonding is not necessarily limited to the silicon direct bonding, so long as the paths through which the fuel gas flows can be sealed from outside, and thus OH radical bonding or eutectic bonding may be used. Similarly, the second silicon substrate 32 and the third silicon substrate 34 are bonded by silicon direct bonding. This bonding is not necessarily limited to the silicon direct bonding, so long as the paths through which the fuel gas flows can be sealed from outside, and thus OH radical bonding or eutectic bonding may be used. The fuel cell 4 is manufactured according to the above processes.

Figure 16:
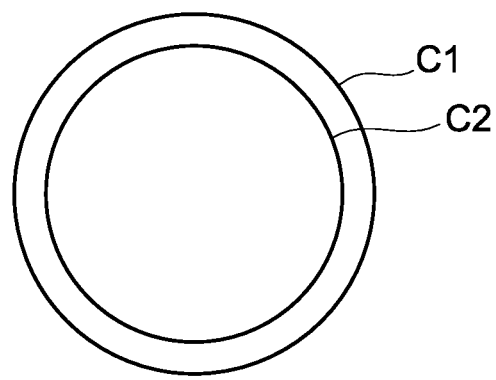
FIG. 16 is a plan view showing an example of a shape of the gas flow paths 48 of the fuel cell 4 of the first embodiment.
Figure 17:
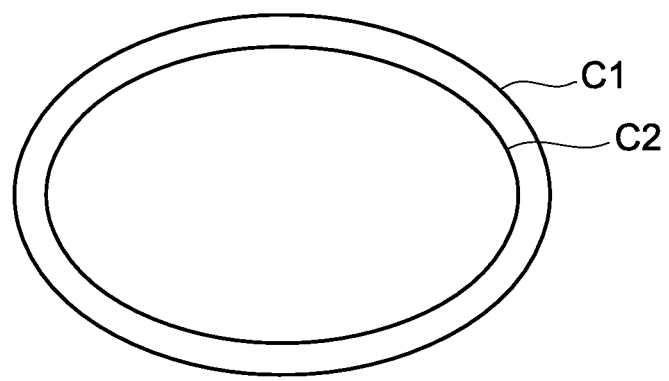
FIG. 17 is a plan view showing another example of the shape of the gas flow paths 48 of the fuel cell 4 of the first embodiment.
Figure 18:
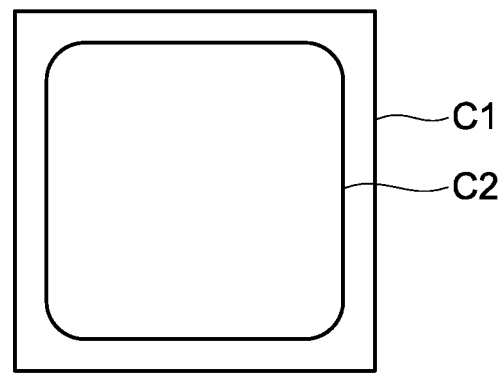
FIG. 18 is a plan view showing yet another example of the shape of the gas flow paths 48 of the fuel cell 4 of the first embodiment.
Figure 19:
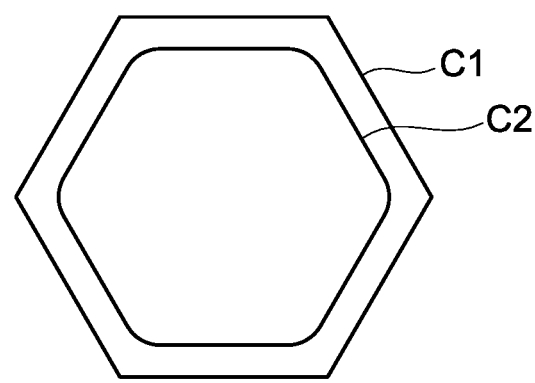
FIG. 19 is a plan view showing yet another example of the shape of the gas flow paths 48 of the fuel cell 4 of the first embodiment.

A cross sectional shape of the gas flow paths 48 may be designed as various types of shapes. FIG. 16 shows a relationship between a cross sectional shape C1 of an opening of each gas flow path 48 on the rear surface side and a cross sectional shape C2 of an opening of the gas flow path 48 on the front surface side. When the cross sectional shape of each gas flow path 48 is designed to be circular. Here, the cross sectional shape C2 of the opening of the gas flow path 48 on the front surface side shows a shape of a range where the electrolyte film 36 and the second electrode film 50 make contact to each other at the upper end of the gas flow path 48. Here, a region between the cross sectional shape C1 of the opening of the gas flow path 48 on the rear surface side and the cross sectional shape C2 of the opening of the gas flow path 48 on the front surface side corresponds to the fillet-shaped portion of the side wall of the gas flow path 48. A difference between a radius of the cross sectional shape C1 of the opening of the gas flow path 48 on the rear surface side and a radius of the cross sectional shape C2 of the opening of the gas flow path 48 on the front surface side corresponds to the radius of curvature of the fillet-shaped portion of the side wall of the gas flow path 48. Similarly, FIG. 17 shows a relationship between the cross sectional shape C1 of the opening of each gas flow path 48 on the rear surface side and the cross sectional shape C2 of the opening of the gas flow path 48 on the front surface side, when the cross sectional shape of each gas flow path 48 is designed to be elliptic. FIG. 18 shows a relationship between the cross sectional shape C1 of the opening of each gas flow path 48 on the rear surface side and the cross sectional shape C2 of the opening of the gas flow path 48 on the front surface side, when the cross sectional shape of each gas flow path 48 is designed to be quadrangular. FIG. 19 shows a relationship between the cross sectional shape C1 of the opening of each gas flow path 48 on the rear surface side and the cross sectional shape C2 of the opening of the gas flow path 48 on the front surface side, when the cross sectional shape of each gas flow path 48 is designed to be hexagonal. In all of these cases, the cross sectional shape C2 of the opening of each gas flow path 48 on the front surface side is small as compared to the cross sectional shape C1 of the opening of the gas flow path 48 on the rear surface side, and the side wall of each gas flow path 48 has the fillet shape at its portion close to the electrolyte film 36. With the configuration as above, the vicinities of the corners at the upper ends of the gas flow paths 48 can be suppressed from becoming the stress concentrating portions. That is, the fillet shape can disperse the stress. Due to this, even when the fuel cell 4 repeatedly turns on and off, as the result of which the temperature rise and drop (between 500 to 700° C. and the room temperature) are repeated, and the warpage is repeatedly generated in the third silicon substrate 34 on which the electrolyte film 36, the insulating film 38, and the insulating films 52 having the different linear expansion coefficients therefrom are provided, extreme stress concentration does not occur in the electrolyte film 36 in the vicinities of the corners at the upper ends of the gas flow paths 48 being the stress concentrating portions, and damage to the electrolyte film 36 can be suppressed.

Second Embodiment

Figure 20:
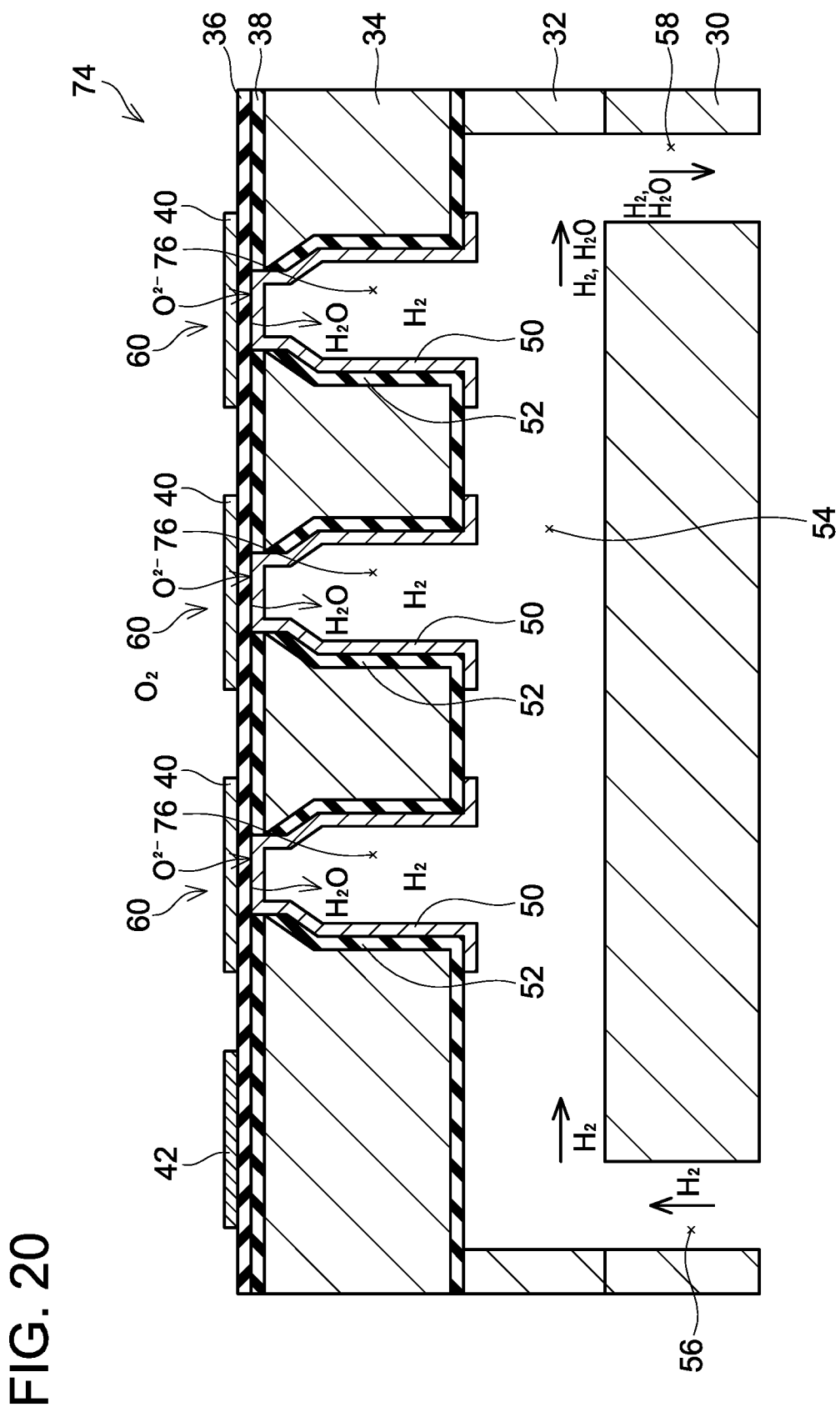
FIG. 20 is a vertical cross sectional view of a fuel cell 74 of the second embodiment.

A fuel cell 74 of the present embodiment shown in FIG. 20 includes configurations similar to those of the fuel cell 4 of the first embodiment. The fuel cell 74 of the present embodiment is also used by being assembled in the fuel cell system 2 shown in FIG. 1, similar to the fuel cell 4 of the first embodiment. Hereinbelow, the fuel cell 74 of the present embodiment will be described in detail regarding its differences from the fuel cell 4 of the first embodiment, and descriptions related to common features will be omitted.

As shown in FIG. 20, in the fuel cell 74 of the present embodiment, an inclination angle of side walls of gas flow paths 76 at their fillet-shaped portions relative to the electrolyte film 36 is substantially 55 degrees, and the inclination angle of the side walls of the gas flow paths 76 relative to the electrolyte film 36 is substantially 90 degrees at positions apart from the electrolyte film 36. In the fuel cell 74 of the present embodiment as well, similar to the fuel cell 4 of the first embodiment, when the third silicon substrate 34 is seen in the plan view, the fillet-shaped portion of the side wall of each gas flow path 76 extends over an entire circumference of the gas flow path 76. With the configuration as above, the stress concentration at the corners of the upper ends of the gas flow paths 76 can be suppressed. That is, the fillet shape can disperse the stress. Due to this, even when the fuel cell 74 repeatedly turns on and off, as the result of which the temperature rise and drop (between 500 to 700° C. and the room temperature) are repeated, and the warpage is repeatedly generated in the third silicon substrate 34 on which the electrolyte film 36, the insulating film 38, and the insulating films 52 having the different linear expansion coefficients therefrom are provided, extreme stress concentration does not occur in the electrolyte film 36 in vicinities of the corners at the upper ends of the gas flow paths 76 being the stress concentrating portions, and damage to the electrolyte film 36 can be suppressed. Further, with the configuration as above, since the gas flow paths 76 are not widened so much in the lateral direction even if the gas flow paths 76 are deepened in the vertical direction, the dead space can be reduced and the integration and the miniaturization of the power generating elements 60 can be enhanced.

Hereinbelow, a method of manufacturing the fuel cell 74 of the present embodiment will be described regarding points differing from that of the fuel cell. 4 of the first embodiment.

Figure 21:
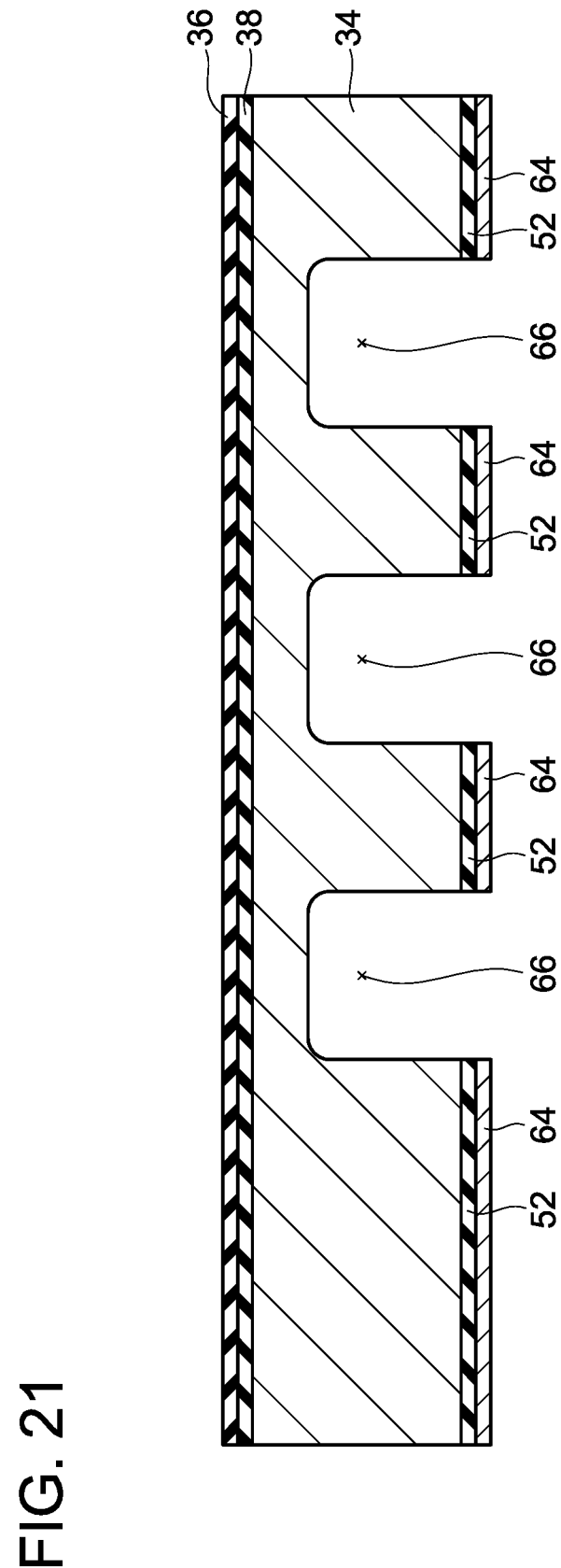
FIG. 21 is a diagram explaining a manufacturing method of the fuel cell 74 of the second embodiment.

Unlike the manufacturing method of the first embodiment shown in FIG. 11, when the deep reactive ion etching of silicon is performed in the fuel cell 74 of the present embodiment, the deep reactive ion etching is terminated in a state where the centers of the trenches 66 have not reached the insulating film 38 as shown in FIG. 21. Although not shown, the side walls of the trenches 66 have the deposited films formed thereon at this stage.

Figure 22:
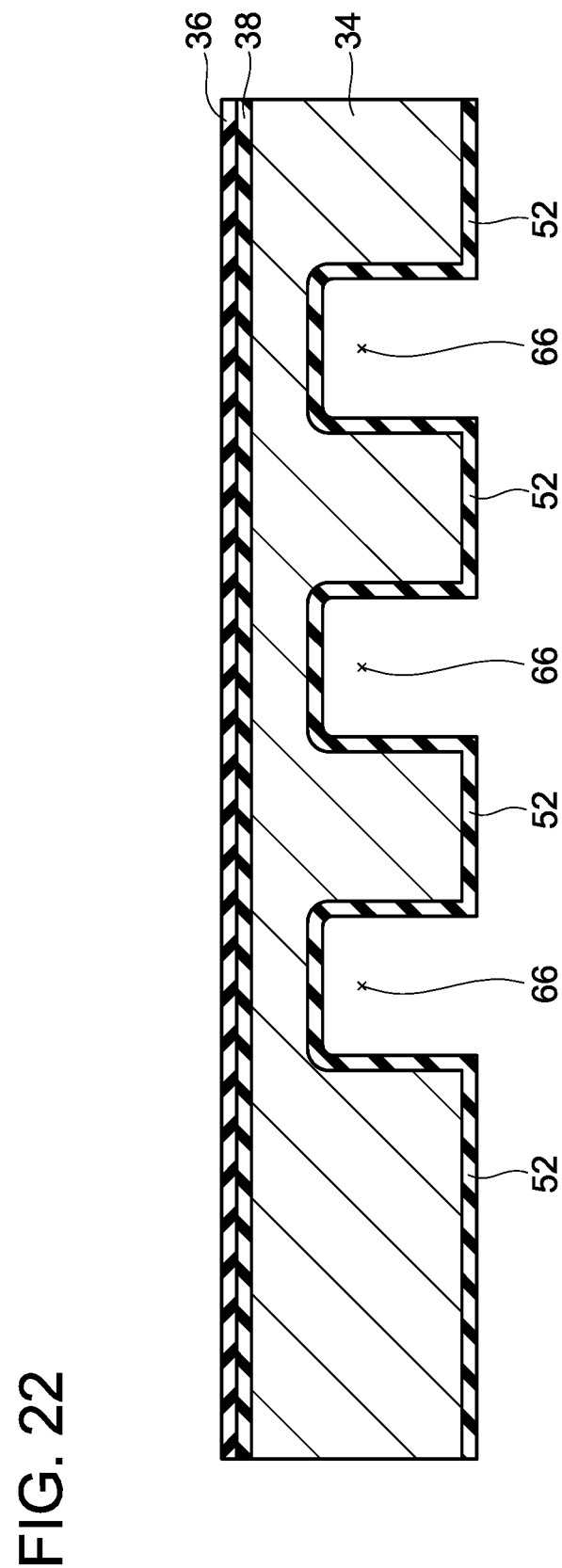
FIG. 22 is a diagram explaining the manufacturing method of the fuel cell 74 of the second embodiment.

Next, as shown in FIG. 22, the deposited films on the side walls of the trenches 66 and the resist 64 on the insulating film 52 are removed by the oxygen plasma ashing. By performing this oxygen plasma ashing over a long period of time, the insulating film 52, which is a silicon oxide film with a thickness of 10 to 50 nm, is formed on the side wall of each trench 66 after the deposited films on the side walls of the trenches 66 have been removed. The insulating film 52 that is the silicon oxide film formed on the rear surface side of the third silicon substrate 34 and the insulating films 52 that are the silicon oxide films formed on the side walls of the trenches 66 have different thicknesses, however, they are shown with about same degree of thickness in the drawings for the sake of easier understanding.

Figure 23:
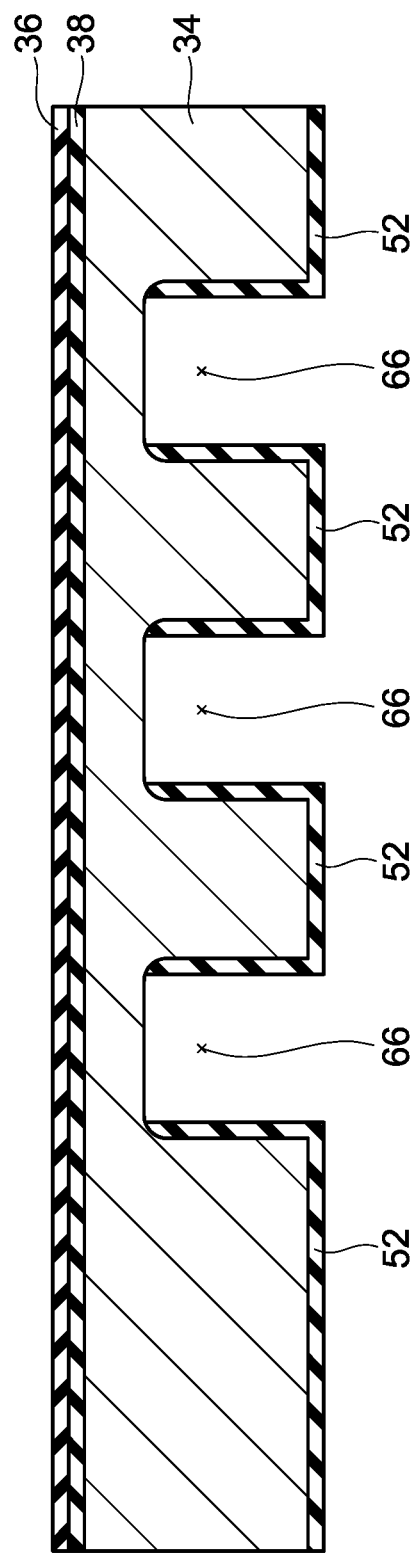
FIG. 23 is a diagram explaining the manufacturing method of the fuel cell 74 of the second embodiment.

Next, as shown in FIG. 23, only the insulating film 52 at a leading end of each trench 66 is removed by RIE or DRIE of silicon oxide. At this occasion, if an entire-surface etching using DRIE is performed, only the insulating films 52 at the leading ends of the trenches 66 are etched off faster than the insulating film 52 on the rear surface side of the third silicon substrate 34 since the thickness of the insulating films 52 at the leading ends of the trenches 66 is smaller, and the silicon is exposed at the leading ends of the trenches 66.

Figure 24:
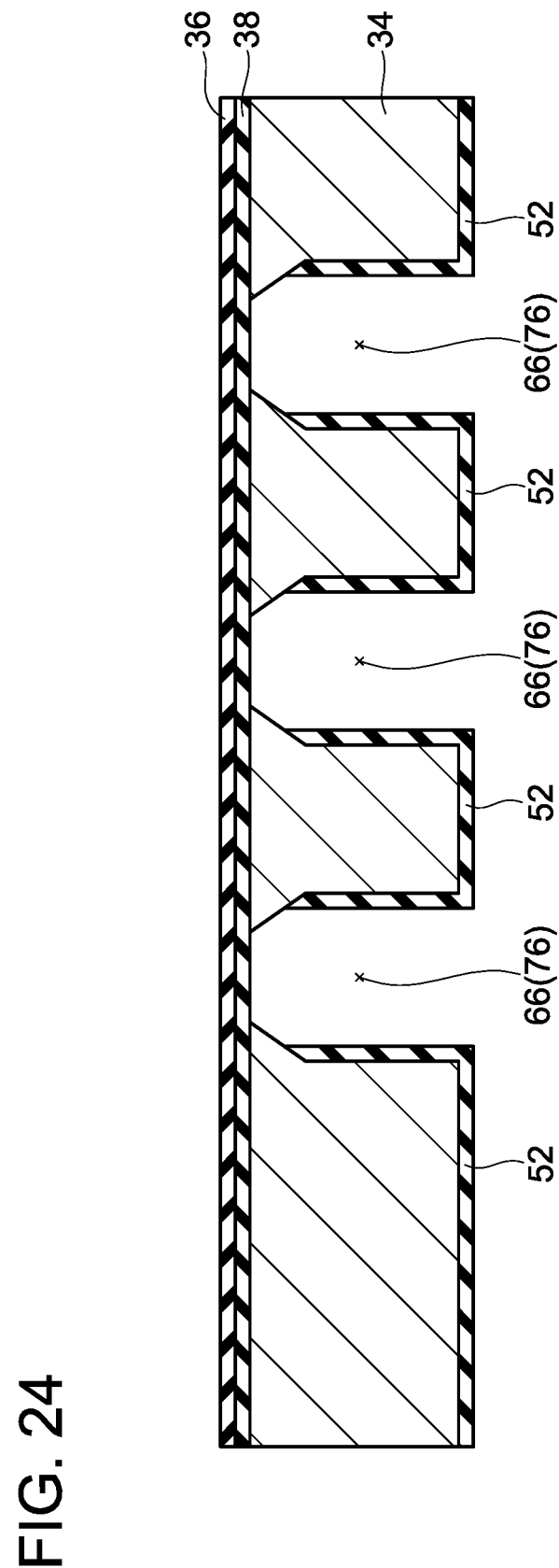
FIG. 24 is a diagram explaining the manufacturing method of the fuel cell 74 of the second embodiment.

Next, as shown in FIG. 24, the anisotropic etching of silicon is performed. At this occasion, the electrolyte film 36 is protected so as not to be influenced by the anisotropic etching by covering an entire surface thereof by a jig, or by applying wax or the like. TMAH (tetramethylammonium hydroxide) solution is used in the anisotropic etching. In this TMAH solution, a silicon oxide film has a high selection ratio of 1000 or greater relative to silicon, so it functions as a masking material. Due to this, the side walls of the trenches 66 are protected by the insulating films 52 without being etched. This anisotropic etching brings the leading ends of the trenches 66 to reach the insulating film 38. The trenches 66 constitute the gas flow paths 76. At this stage, silicon of the third silicon substrate 34 is exposed on the side walls of the gas flow paths 76 formed by the anisotropic etching.

Figure 25:
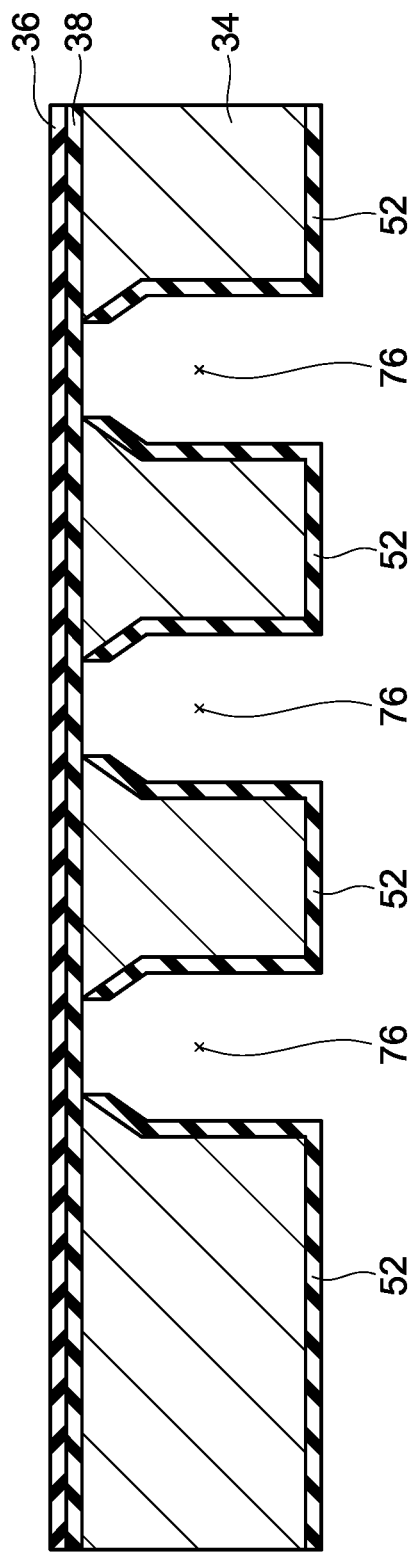
FIG. 25 is a diagram explaining the manufacturing method of the fuel cell 74 of the second embodiment.

Next, as shown in FIG. 25, silicon oxide films are formed at portions where silicon is exposed in the gas flow paths 76. Due to this, the side walls of the gas flow paths 76 are covered by the insulating films 52. A cross sectional shape of an opening of each gas flow path 76 on the rear surface side exhibits the quadrangular shape C1 as shown in FIG.

18, from the viewpoint of the anisotropic etching, and a cross sectional shape of an opening of the gas flow path 76 on the front surface side exhibits the shape C2 of FIG. 18 with its corners angled at 90 degrees.

Figure 26:
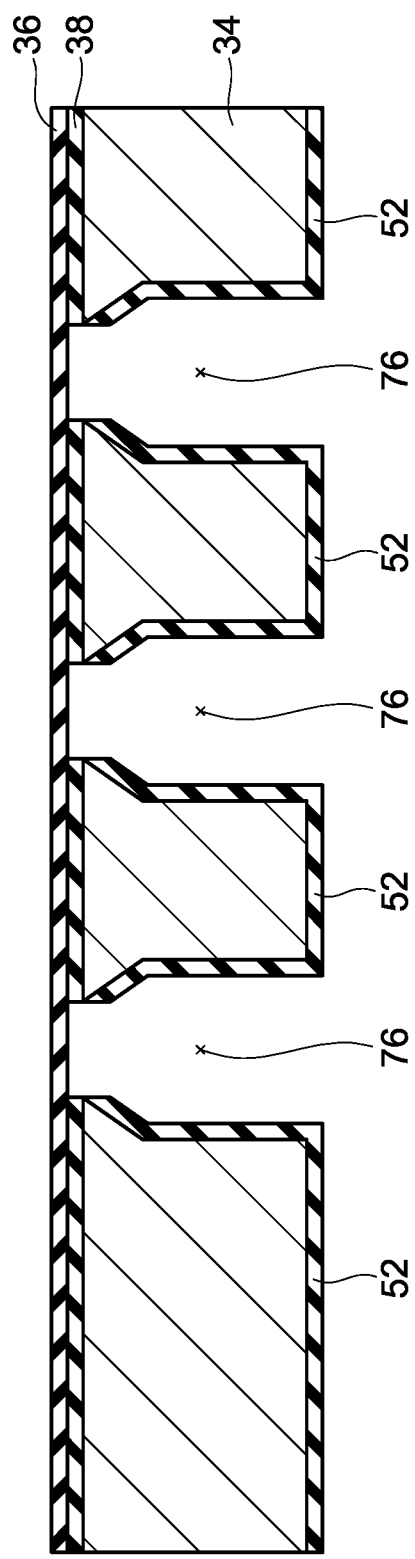
FIG. 26 is a diagram explaining the manufacturing method of the fuel cell 74 of the second embodiment.

Next, as shown in FIG. 26, only the insulating film 38 at the upper ends of the gas flow paths 76 is removed by RIE or DRIE of silicon oxide.

After this, similarly to the fuel cell 4 of the first embodiment, the first electrode films 40, the first electrode pad 42, the wiring 44, the second electrode pad 46, the second electrode films 50, the through silicon via, and the wiring are respectively formed, and then the first silicon substrate 30 and the second silicon substrate 32 are bonded to the third silicon substrate 34 to manufacture the fuel cell 74. For the bonding between the second silicon substrate 32 and the third silicon substrate 34, the OFT radical bonding via the insulating films 52 is used.

(Applications of Fuel Cell System 2)

As above, according to the fuel cell 4 of the first embodiment and the fuel cell 74 of the second embodiment, even when the fuel cells 4, 74 repeatedly turn on and off, as the result of which the temperature rise and drop (between 500 to 700° C. and the room temperature) are repeated, and the warpage is repeatedly generated in the third silicon substrate 34 on which the electrolyte film 36, the insulating film 38, and the insulating films 52 having the different linear expansion coefficients therefrom are formed, extreme stress concentration does not occur in the electrolyte film 36 in the vicinities of the corners at the upper ends of the gas flow paths 48, 76 being the stress concentrating portions, and damage to the electrolyte film 36 can be suppressed. Further, according to the fuel cell 4 of the first embodiment and the fuel cell 74 of the second embodiment, since the gas flow paths 48, 76 are not widened so much in the lateral direction even if the gas flow paths 48, 76 are deepened in the vertical direction, the dead space can be reduced and the integration and the miniaturization can be enhanced. Due to this, the solid oxide fuel cells 4, 74 that are compact and resistant to damage, and that can repeat to turn on and off can be provided. Thus, the fuel cell system 2 (see FIG. 1) in which the solid oxide fuel cell 4, 74 is assembled as above can be used for applications that were conventionally unknown.

Figure 27:
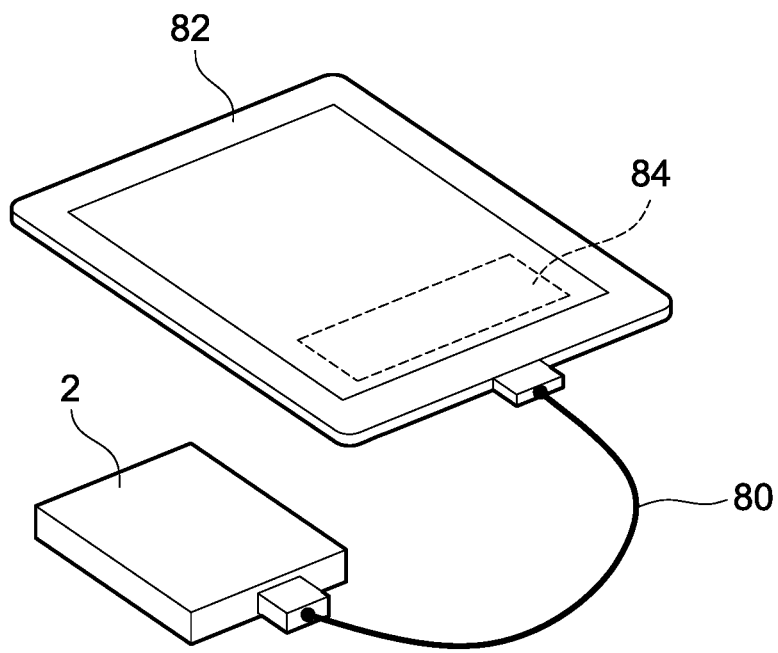
FIG. 27 is a diagram showing an example of an application of the fuel cell system 2 of the first and second embodiments.

For example, as shown in FIG. 27, the fuel cell system 2 may be used as a charger capable of connecting to a mobile device 82, such as a tablet, via a charger cable 80. In this case, by employing a configuration in which a battery 84 provided in the mobile device 82, a power load of the mobile device 82, and the fuel cell system 2 can be connected electrically in parallel, and in which a power supply destination can be switched by a selector switch, the fuel cell system 2 can charge the battery 84 and also supply power to the power load of the mobile device 82.

Figure 28:
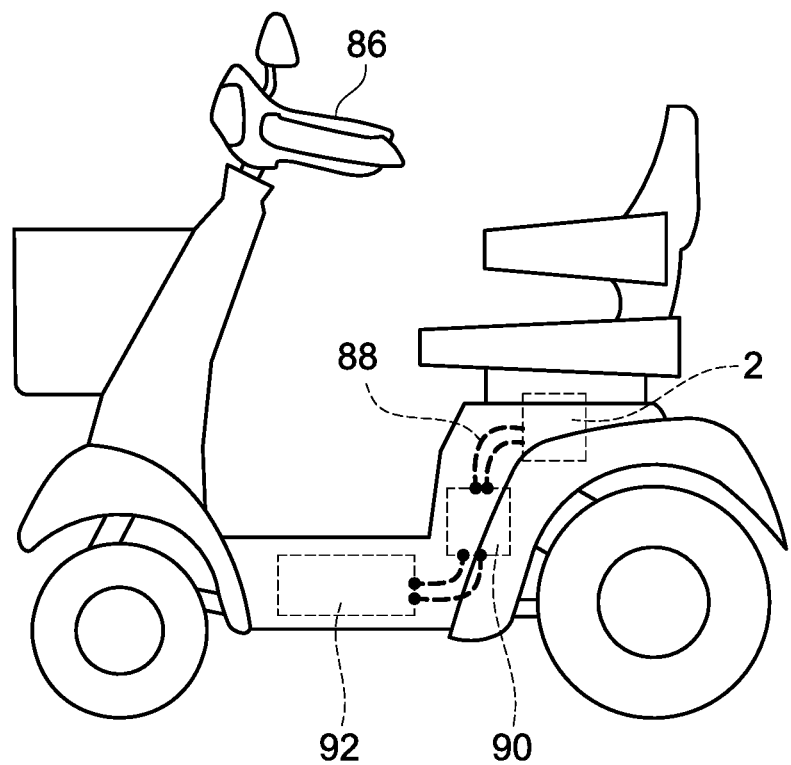
FIG. 28 is a diagram showing another example of the application of the fuel cell system 2 of the first and second embodiments.

Alternatively, as shown in FIG. 28, the fuel cell system 2 can be used as a sub-battery that is mounted in a power-driven compact mobility vehicle 86 (such as a mobility scooter). In this case, the fuel cell system 2 is connected to a battery 90 included in the compact mobility vehicle 86 via a power supply wire 88. In this case, by employing a configuration in which the battery 90 included in the compact mobility vehicle 86, a motor 92 of the compact mobility vehicle 86, and the fuel cell system 2 are electrically connected in parallel, and in which a power supply destination can be switched by a selector switch, the fuel cell system 2 can charge the battery 90 and also supply power to the motor 92.

Figure 29:
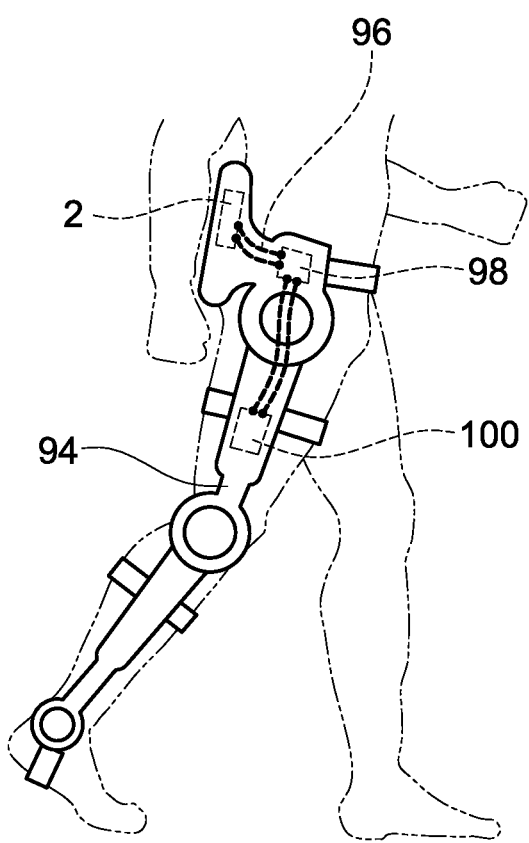
FIG. 29 is a diagram showing yet another example of the application of the fuel cell system 2 of the first and second embodiments.

Alternatively, as shown in FIG. 29, the fuel cell system 2 can be used as a sub-battery of a power-driven walking support robot 94. In this case, the fuel cell system 2 is connected to a battery 98 included in the walking support robot 94 via a power supply wire 96. In this case, by employing a configuration in which the battery 98 included in the walking support robot 94, a motor 100 of the walking support robot 94, and the fuel cell system 2 are electrically connected in parallel, and in which a power supply destination can be switched by a selector switch, the fuel cell system 2 can charge the battery 98 and also supply power to the motor 100.

What is claimed is:

1. A solid oxide fuel cell comprising:
a silicon substrate;
an electrolyte film laminated on the silicon substrate; and
a gas flow path formed inside the silicon substrate,
wherein the electrolyte film is a planar shape lying in a single plane, and is opposed to the gas flow path via an electrode film, and
wherein a portion of a side wall of the gas flow path has a fillet shape, and the portion is at an upper end of the gas flow path,
an inclination angle of the portion of the side wall of the gas flow path having the fillet shape with respect to the electrolyte film gradually changes, and
an inclination angle of the side wall of the gas flow path with respect to the single plane of the electrolyte film is 90 degrees at a position below the portion of the side wall of the gas flow path having the fillet shape.

2. The fuel cell according to claim 1, wherein in a plan view of the silicon substrate, the portion of the side wall of the gas flow path having the fillet shape extends over an entire circumference of the gas flow path.

3. The fuel cell according to claim 1, wherein a radius of curvature of the portion of the side wall of the gas flow path having the fillet shape is within a range of 1 μm to 10 μm.

4. The fuel cell according to claim 2, wherein a radius of curvature of the portion of the side wall of the gas flow path having the fillet shape is within a range of 1 μm to 10 μm.

* * * * *